United States Patent [19]
Tabata et al.

[11] Patent Number: 5,440,369
[45] Date of Patent: Aug. 8, 1995

[54] COMPACT CAMERA WITH AUTOMATIC FOCAL LENGTH DEPENDENT EXPOSURE ADJUSTMENTS

[75] Inventors: Yasushi Tabata; Norio Numako; Kosei Kosako, all of Tokyo, Japan

[73] Assignee: Asahi Kogaku Kogyo Kabushiki Kaisha, Tokyo, Japan

[21] Appl. No.: 159,207

[22] Filed: Nov. 30, 1993

[30] Foreign Application Priority Data

Nov. 30, 1992 [JP] Japan .................................. 4-343357
Nov. 30, 1992 [JP] Japan .................................. 3-343358
Nov. 30, 1992 [JP] Japan .................................. 4-343359

[51] Int. Cl.⁶ .................................................. G03B 7/08
[52] U.S. Cl. .................................. 354/432; 354/414; 354/195.1
[58] Field of Search .............. 354/432, 434, 429, 414, 354/195.1, 195.12

[56] References Cited

U.S. PATENT DOCUMENTS

| 4,912,495 | 3/1990 | Ishikawa et al. .................... 354/432 |
| 5,021,818 | 6/1991 | Satoh et al. . |
| 5,023,649 | 6/1991 | Hayashi et al. .................... 354/434 |
| 5,289,225 | 2/1994 | Hirai . |

Primary Examiner—Russell E. Adams
Attorney, Agent, or Firm—Sandler, Greenblum & Bernstein

[57] ABSTRACT

A compact camera has a variable focal length photographing optical system, a multisegment photometric system that is separate from the photographing optical system, each segment outputting a brightness level, and a controller that determines an exposure value for exposing a film by using weighting coefficients to calculate a weighted average of the brightness levels outputted by the photometric system. The weighting coefficients vary according to the focal length of the photographing optical system.

52 Claims, 20 Drawing Sheets f = 35mm f = 60mm f = 80mm

FIG. 9
| EXPOSURE MODE | MODE MEMORY | DISPLAY |
|---|---|---|
| AUTOMATIC MODE | 0 | NOT DISPLAYED |
| FLASH-ON MODE | 1 |  |
| FLASH-OFF MODE | 2 |  |

COMPACT CAMERA WITH AUTOMATIC FOCAL LENGTH DEPENDENT EXPOSURE ADJUSTMENTS

FIELD OF THE INVENTION

The present invention relates to a compact camera including a photometric sensor having a photodetector surface segmented into a plurality of photoelectric transducer regions for metering an area to be photographed.

BACKGROUND OF THE INVENTION

Compact cameras with zoom lenses usually have a photometric system separate from the zoom lens optical system. Consequently, the photometric range of the photometric sensor does not change according to the angle of view of the zoom lens. Therefore, when the zoom lens is at the wide angle end, the area to be photographed is much larger than the area to be metered by the photometric sensor. Further, when the zoom lens is at the telephoto end the area to be photographed is much smaller than the area to be metered by the photosensor. Thus in both cases given above, the photosensor cannot accurately determine the proper exposure.

When taking photographs of subjects with compact cameras, the brightness of the subject may be different from the brightness of the background, e.g., the subject may be backlit, resulting in a shadow on the front side of the subject. In these backlit situations, the exposure must be compensated.

Heretofore, it has been customary to detect a backlit condition using two photometric sensors, one used to measure the brightness of a small central region of the exposure range, and the other used to measure a larger region of the exposure range, and then determine whether the subject is backlit based on the output from the photometric sensors. If it is determined that the subject is backlit, the flash is discharged to provide additional light to the shadowed area.

However, the conventional arrangement with two photometric sensors may not be effective when incorporated in compact cameras with zoom lenses. As described above, the area to be metered by the photometric sensor remains constant while the area to be photographed varies as the lens is zoomed from the wide angle end to the telephoto end. Therefore, the conventional photometric system may erroneously determine that the subject to be photographed is backlit and discharge the flash, resulting in an overexposed image.

Further, when taking photographs of backlit subjects using the conventional metering system, the photometric sensor that metered the larger region would be unduly influenced by the light source located within its metering area. This would result in a lower exposure value being set in order to prevent an overexposure of the photograph. However, the subject, which is in shadow, would be severely underexposed, resulting in a poor photograph. If taking a photograph of a backlit landscape or in a theater where a flash is ineffective or cannot be used, the camera employing the conventional metering system will always render poor photographs.

SUMMARY OF THE INVENTION

It is therefore an object of the present invention to provide a compact camera that can provide accurate metering of a subject whether a lens (zoom or otherwise) is set to a wide angle end or a telephoto end or any focal length in between.

It is another object of the present invention to provide a compact camera that can accurately determine whether a subject is backlit for any focal length setting of the zoom lens.

It is a further object of the invention, to provide a compact camera that can determine an accurate exposure setting when taking a photograph of a backlit subject, for any focal length setting of a zoom setting, especially in situations where a flash cannot be employed.

According to one aspect of the present invention there is provided a compact camera comprising:
 a photographing optical system, the focal length of which is variable over a certain range;
 a photometric system having a plurality of segments, each segment outputting a brightness level, the photometric system being separate from the photographing optical system; and
 control means to determine an exposure value, the control means using weighting coefficients to calculate a weighted average of the brightness levels outputted by the plurality of segments, the coefficients varying according to said focal length of said optical system, said average brightness level used to determine said exposure value.

According to another aspect of the present invention there is provided a compact camera comprising:
 a photographing optical system having a plurality of focal lengths;
 a photometric system having a plurality of segments, each segment outputting a brightness level, said photometric system separate from said photographing optical system;
 brightness selection means to select a predetermined number of brightness levels having predetermined characteristics; and
 control means to determine an exposure value, said control means further determining whether a subject is backlit by examining said focal length, said selected brightness levels, and backlit threshold levels.

According to a further aspect of the present invention there is provided a compact camera comprising:
 a photographing optical system, the focal length of which is variable over a certain range;
 a photometric system having a plurality of segments, each segment outputting a brightness level, said photometric system separate from said photographing optical system;
 brightness selection means to select a predetermined number of brightness levels having predetermined characteristics; and
 control means to determine an exposure value, said control means further determining an exposure corrective value by examining said focal length, said selected brightness levels, and backlit threshold levels.

A compact camera according to the present invention comprises:
 a photographing optical system, said photographing optical system selectively defining at least two focal lengths;
 a photometric system having a plurality of segments, each segment outputting a brightness signal;
 control means for determining an exposure value, based on a predetermined combination of said plurality of brightness signals; and means for selecting a predetermined combination of said brightness signals in accordance with an occurrence of a predetermined condition of said camera.

The present invention relates to a compact camera comprising:
a photographic optical system which has a plurality of focal lengths;
photometric means for providing signal representative of a brightness of a scene to be photographed by said photographic optical system, said photometric means comprising a plurality of photometering segments, each segment outputting a brightness signal; and
control means for combining brightness signal output from said plurality of photometering segments in accordance with a selected relationship of a plurality of a plurality of relationships, said selected relationship being selected by said control means in accordance with a focal length of said photographic optical system.

DESCRIPTION OF THE ACCOMPANYING DRAWINGS

FIG. 9 is a diagram showing the relationship between exposure modes, mode memory statuses, and symbols or marks displayed on the LCD display;

DESCRIPTION OF THE EMBODIMENT

Figure 1:
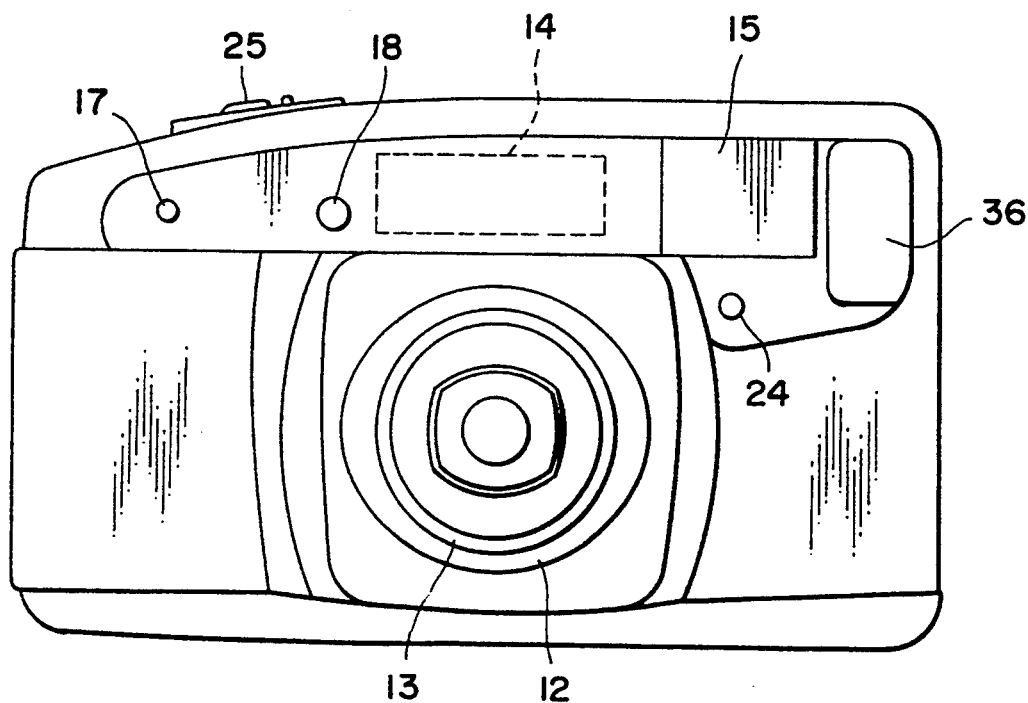
FIG. 1 is a front elevational view of a compact camera according to the present invention.
Figure 2:
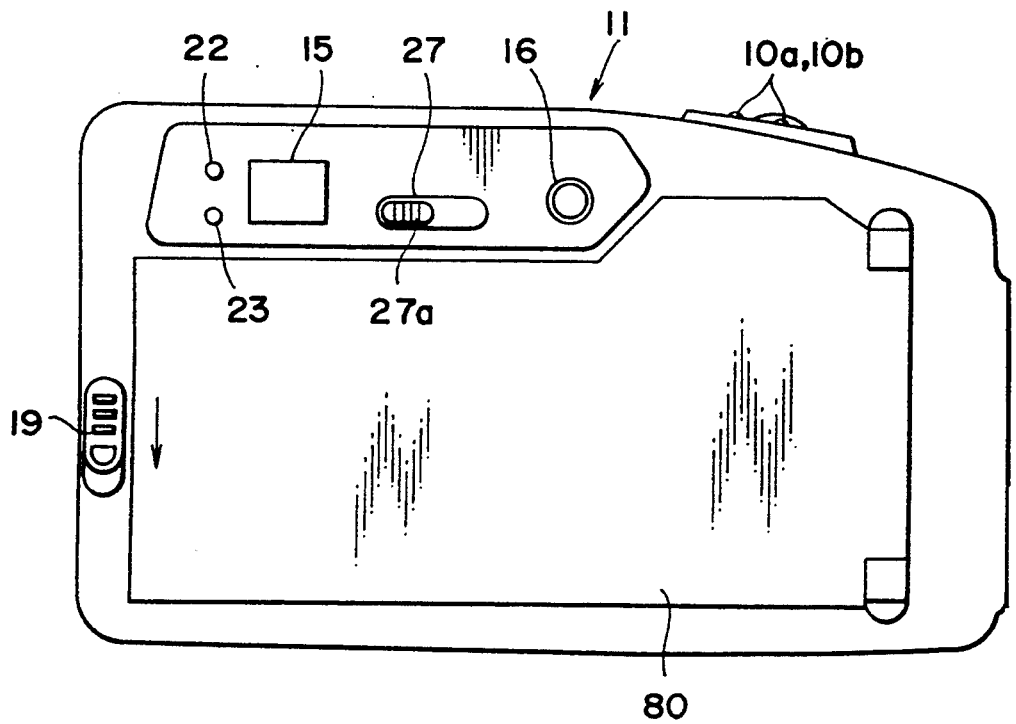
FIG. 2 is a rear elevational view of the compact camera.
Figure 3:
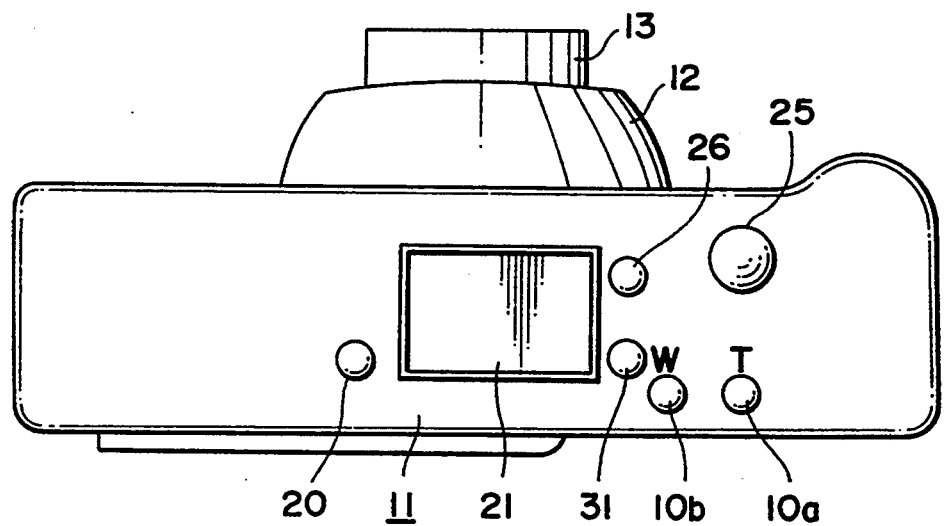
FIG. 3 is a plan view of the compact camera.

As illustrated in FIGS. 1 through 3, a compact camera embodying the invention comprises a camera housing 11 supporting stationary and movable lens barrels 12, 13 on its front panel, the lens barrels 12, 13 holding a plurality of lens components that make up a zoom lens system.

While the use of a zoom lens system is disclosed as the preferred embodiment of the present invention, this is merely an illustrative example of a compact camera to which the present invention is applicable. However, the present invention is also explicitly applicable to non-zoom lens cameras, such as bifocal lens optical systems.

As shown in FIG. 1, the camera housing 11 also supports, above the stationary zoom lens barrel 12, a self-timer lamp 17, a stroboscopic flash reflection detector 18, a rangefinder 14, a viewfinder 15, a photometric sensor 24, and a stroboscopic flash unit 36.

The self-timer lamp 17 is energized such that when the self-timer function is first activated the lamp 17 is continuously lit. Then a few seconds before the shutter releases, the lamp 17 flashes, indicating that the picture is about to be taken.

When the stroboscopic flash unit 36 is in use, the stroboscopic flash reflection detector 18 detects stroboscopic light emitted from the stroboscopic flash unit 36 and reflected by a subject in order to control the emission of light from the stroboscopic flash unit 36.

The photometric sensor 24 comprises a photoelectric transducer or a photosensor in the form of a CdS (cadmium sulfide) cell or silicon diode, and is combined with a condenser lens separate from the zoom lens system. The photometric sensor 24 may perform the function of the stroboscopic flash reflection detector 18 to detect the reflection of stroboscopic light. Therefore the stroboscopic flash reflection detector 18 becomes redundant.

As shown in FIG. 2, the camera housing 11 includes a hinged back cover 80 that can be opened when a back cover opening lever associated with a back cover switch 19 is pushed downward. The camera housing 11 supports on its rear panel a green lamp 22, a red lamp 23, and a panoramic picture lever 27 that are positioned around a rear window of the viewfinder 15 which is disposed on the rear panel of the camera housing 11 above the back cover 80. The panoramic picture lever 27 has a panoramic picture switch 27a. The panoramic picture switch 27a is turned on when a panoramic picture mode is selected by the panoramic picture lever 27 to allow a panoramic picture to be taken by the camera.

When the panoramic picture switch 27a is turned off, a full picture mode is selected. The green lamp 22 is turned on when the zoom lens system is focused on the subject by an automatic focusing mechanism incorporated in the camera. The red lamp 23 flashes while the capacitor of the stroboscopic flash unit 36 is being charged. Once the capacitor is fully charged the red lamp 23 is continuously lit, indicating that the flash can be used.

The rear panel of the camera housing 11 also supports a main switch 16 adjacent to the panoramic picture lever 27. When the main switch 16 is pressed, the main switch 16 switches between a power-off condition and a power-on condition. In the power-off condition, the power supply of the camera is turned off, the zoom lens system is retracted into the camera housing 11, and the shutter of the camera cannot be released. In the power-on condition, the power supply is turned on, the zoom lens system extends out of the camera housing 11, and the shutter of the camera can to be released. The main switch 16 is normally biased to be in the unpressed position.

As illustrated in FIG. 3, the camera housing 11 supports on its upper panel a shutter release button 25, a liquid crystal display (LCD) 21, a mode switch 20, an infinity landscape switch 26, a drive switch 31, a tele setting switch 10a, and a wide setting switch 10b. The shutter release button 25 is capable of turning on and off two switches, i.e., a photometric switch 15a and a shutter release switch 15b (see FIG. 7).

More specifically, when the shutter release button 25 is partially depressed, the photometric switch 15a is turned on, and the distance up to the subject and the brightness of the subject are measured using the photometric sensor 24 and the rangefinder 14. When the shutter release switch 15b is turned on (by fully depressing the shutter release button 25), the shutter of the camera is released to expose a frame of the photographic film loaded in the camera housing 11.

The LCD 21 displays various camera settings as described later. The mode switch 20 selects one of the exposure modes of the camera. The drive switch 31 selects one of the photographing modes of the camera. The infinity landscape switch 26 overrides the autofocus system of the camera and forces the lens to be focused at infinity, enabling the accurate photographing of distant subjects.

The distance up to the subject is measured by the rangefinder 14 which emits infrared radiation toward the subject, detects a reflection from the subject, and effects trigonometric measurements based on the reflected radiation. There is a certain limitation on the automatic operation of the rangefinder 14 depending on the capabilities of the infrared emitting and detecting elements of the rangefinder 14. If the rangefinder 14 fails to detect the reflection from the subject, then the rangefinder 14 automatically sets the focused position to the maximum distance that can be measured. When a distant scene is photographed under this condition, the camera cannot completely focus on the subject, and the image of the subject produced by the camera is out of focus. To prevent the subject image from being out of focus, the camera according to the present invention can select the infinity landscape mode in which the camera is focused at infinity.

The movable zoom lens barrel 13 can be continuously moved in the axial direction toward the tele or wide end of zooming movement when the tele setting switch 10a or the wide setting switch 10b is pressed.

Figure 4:
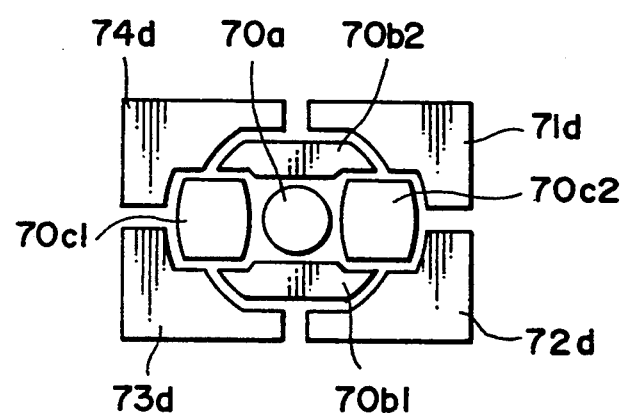
FIG. 4 is a plan view of the photodetector surface of a photometric sensor of the compact camera.

As shown in FIG. 4, the photometric sensor 24 has a photodetector surface divided into nine detecting regions 70a, 70b1, 70b2, 70c1, 70c2, 71d, 72d, 73d, and 74d for more accurate metering of the subject and background, thus enabling the camera to optimize the exposure.

The detecting regions 71d, 72d, 73d, and 74d that are positioned around the other detecting regions 70a, 70b1, 70b2, 70c1, and 70c2 are electrically connected to each other to produce a single output signal. Therefore, the photometric sensor 24 performs the metering operation based on six output signals.

Figure 5A:
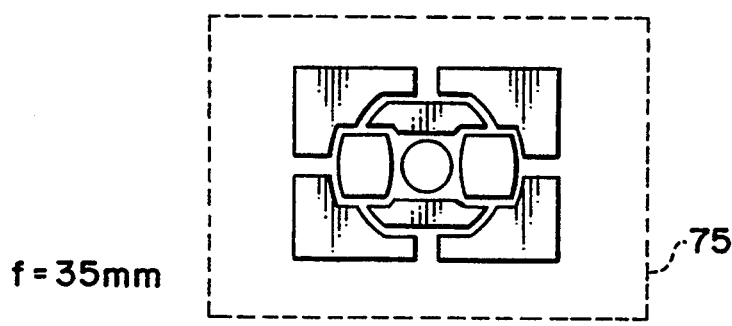
FIGS. 5A through 5C are plan views showing the metering area of the photometric sensor in relationship to the area of a frame to be exposed as the lens is zoomed from a wide end towards a tele end.
Figure 5B:
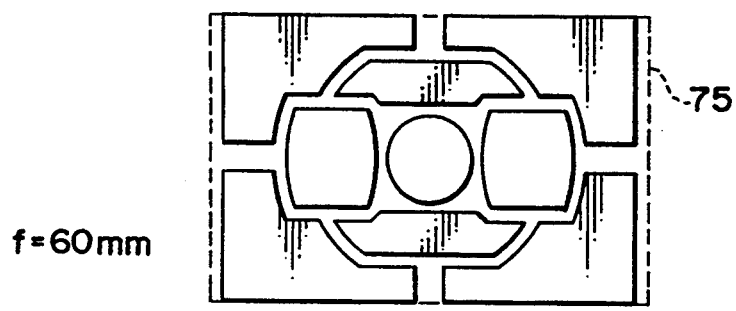
Figure 5C:
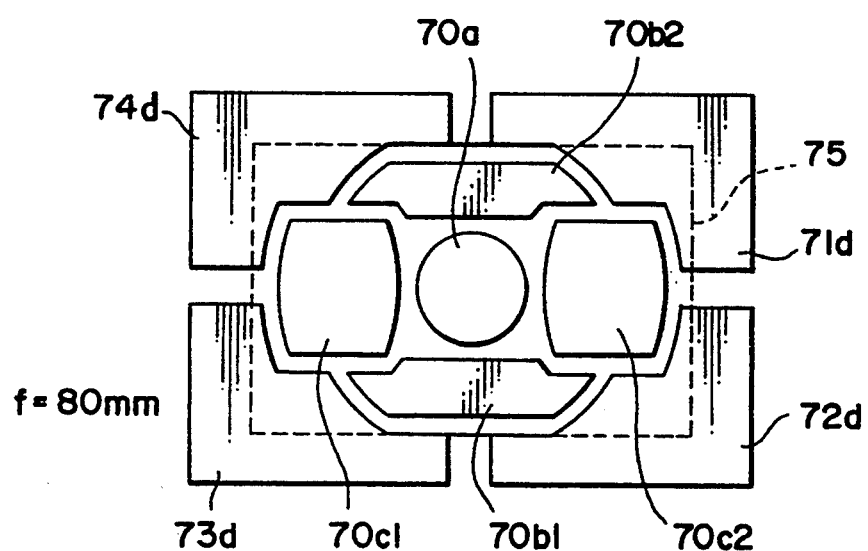

FIGS. 5A through 5C and 6A, 6B show the relationship between the area metered by the photometric sensor 24 and the area to be exposed by the zoom lens system. In FIGS. 5A through 5C, the dashed lines 75 indicate the area of the frame to be exposed, and the solid lines indicate the area that is metered by the photometric sensor 24.

Figure 6A:
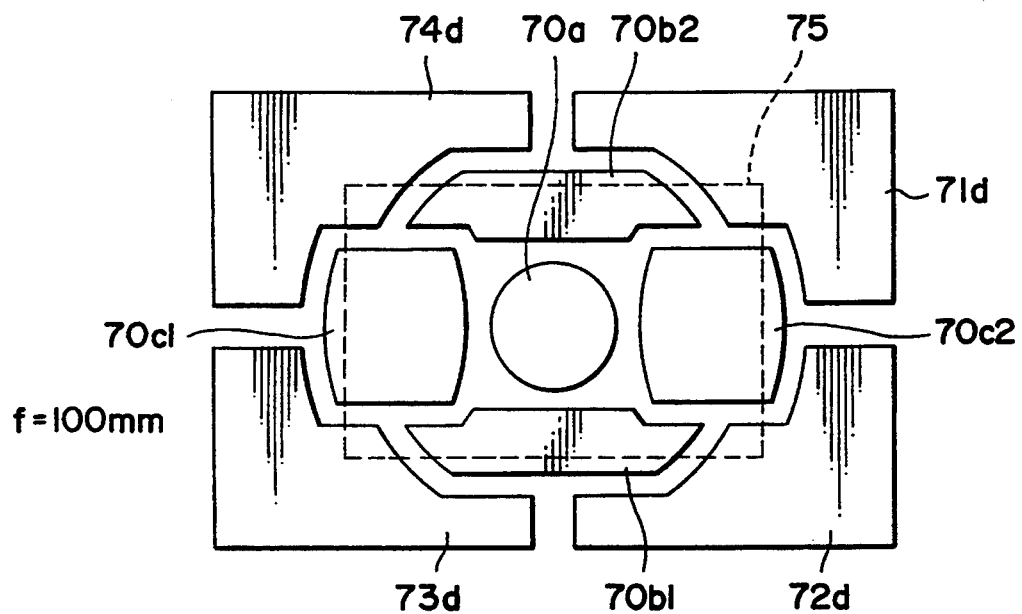
FIGS. 6A and 6B are plan views showing the metering area of the photometric sensor in relationship to the area of a frame to be exposed as the lens is zoomed further towards a tele end, than shown in FIGS. 5A through 5C.
Figure 6B:
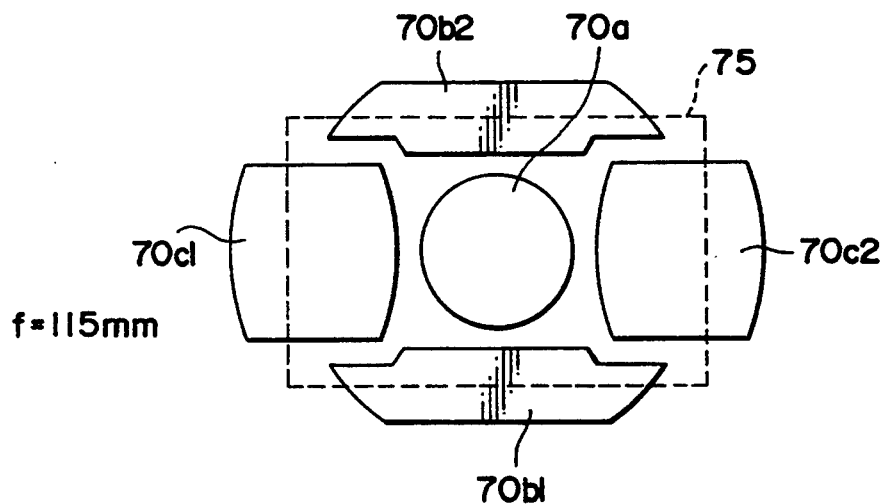

Specifically, FIG. 5A illustrates the area of the frame that is metered by the photometric sensor 24 when the focal length of the zoom lens is 35 mm. Similarly FIGS. 5B and 5C show the area of the frame that is metered by the photometric sensor 24 for focal lengths of 60 mm and 80 mm, respectively. FIGS. 6A and 6B show the area of the frame that is metered by the photometric sensor for focal lengths of 100 mm and 115 mm, respectively. Thus as the zoom lens is moved from the wide angle end to the telephoto end the area to be metered by the photometric sensor 24 becomes larger relative to the area of the frame to be exposed.

Figure 7:
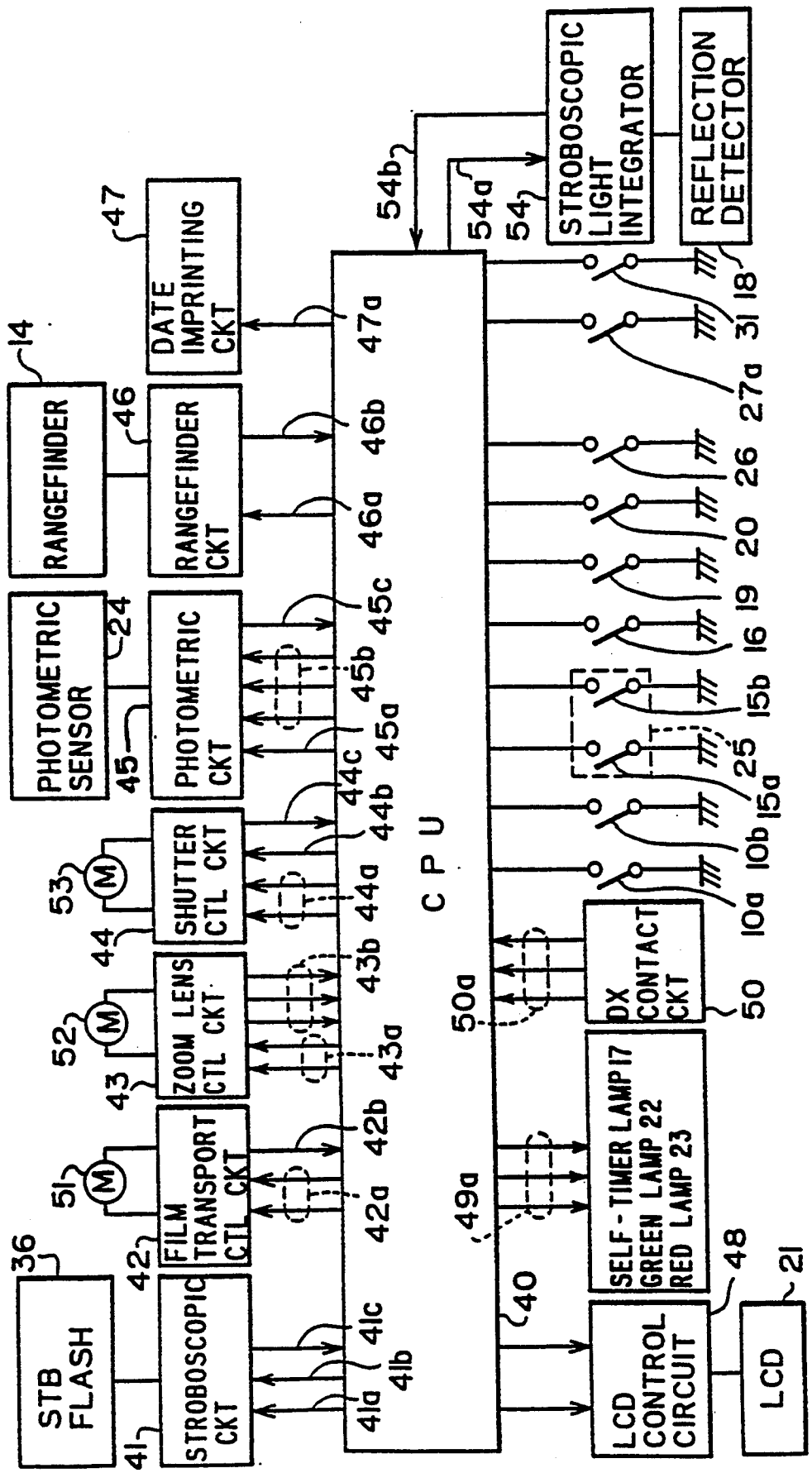
FIG. 7 is an electric circuit block diagram of the compact camera.

FIG. 7 shows an electric circuit block diagram of the compact camera. The electric circuit includes a central processing unit (CPU) 40 that is a control system for a stroboscopic circuit 41, a film transport control circuit 42, a zoom lens control circuit 43, a shutter control circuit 44, a photometric circuit 45, a rangefinder circuit 46, a date imprinting circuit 47, an LCD control circuit 48, the self-timer lamp 17, the green lamp 22, the red lamp 23, a DX contact circuit 50, and a stroboscopic light integrator 54. The CPU 40 supplies a charge permission signal and a stroboscopic flash control signal to the stroboscopic circuit 41 through signal lines 41a, 41b. The charge permission signal serves to permit the capacitor of the stroboscopic flash unit 36 to be charged. The stroboscopic flash control signal serves to control energization and de-energization of the stroboscopic flash unit 36 which is connected to the stroboscopic circuit 41. The stroboscopic circuit 41 supplies a charge completion signal to indicate whether the capacitor has been charged or not, to the CPU 40 through a signal line 41c.

The film transport control circuit 42, to which an electric motor 51 for winding the film is connected, is supplied with a signal for energizing the motor 51 to rotate in one direction or the other through signal lines 42a from the CPU 40. A photoreflector (not shown) that is positioned at a film rail in the camera housing 11 for identifying perforations in the film is also connected to the film transport control circuit 42. Each time one of the perforations moves past the photoreflector, the photoreflector generates a pulse, which is applied from the film transport control circuit 42 through a signal line 42b to the CPU 40. Therefore, the CPU 40 counts exposed frames of the film as it is wound by the motor 51 based on pulses that are successively applied to the CPU 40.

An electric motor 52 for actuating the zoom lens system is connected to the zoom lens control circuit 43. When the tele setting switch 10a or the wide setting switch 10b is turned on, the CPU 40 supplies a control signal through signal lines 43a to the zoom lens control circuit 43 to energize the motor 52 to rotate in one direction or the other, thereby moving the movable zoom lens barrel 13 toward the tele end or the wide end. As the zoom lens barrel 13 moves a code signal is supplied through signal lines 43b to the CPU 40 to enable detection of the focal length of the zoom lens system. Based on the code signal, the CPU 40 can detect when the zoom lens system has reached the desired position on its zooming movement.

The shutter control circuit 44 is connected to a stepping motor 53 which is used to actuate the zoom lens system for automatically focusing itself on a subject and to open and close the shutter sectors. To take a picture of a subject, the CPU 40 supplies a pulse signal through signal lines 44a to the shutter control circuit 44 for enabling the stepping motor 53 to move the zoom lens system to focus on the subject based on the distance up to the subject which has been detected by the rangefinder 14. The CPU 40 then supplies a signal through a signal line 44b to the shutter control circuit 44 to turn on an electromagnet (not shown) to latch the zoom lens system in a focused position. Thereafter, the shutter control circuit 44 controls the stepping motor 53 to open the shutter sectors to take a picture.

After the picture has been taken, the shutter control circuit 44 controls the stepping motor 53 to close the shutter sectors. The CPU 40 then supplies a reverse pulse signal through the signal lines 44a to the shutter control circuit 44 to return the focus lens group back to its original position. When the focus lens group reaches its original position, the shutter control circuit 44 supplies a signal corresponding to the original position through a signal line 44c to the CPU 40. At this time, the CPU 40 stops supplying the reverse pulse signal through the signal lines 44a to the shutter control circuit 44.

The CPU 40 supplies a control signal through a signal line 45a to turn on or off the photometric circuit 45 to which the photometric sensor 24 is connected. The CPU 40 supplies a three-bit signal through signal lines 45b to the photometric circuit 45 to select one of the six detecting regions 70a, 70b1, 70b2, 70c1, 70c2, 71d through 74d, the detecting regions 71d through 74d which are connected together being counted as one detecting region. These detecting regions 70a, 70b1, 70b2, 70c1, 70c2, 71d through 74d generate respective photocurrents depending on the intensities of the incident light. The photometric circuit 45 logarithmically then compresses the photocurrent from the selected detecting region, amplifies the compressed photocurrent, and converts the amplified photocurrent into an analog voltage signal. The photometric circuit 45 then supplies the analog voltage signal through a signal line 45c to the CPU 40, which determines the brightness of the subject in the form of digital data produced by an A/D converter (not shown) in the CPU 40.

Therefore, the CPU 40 can determine the brightness of the subject from each of the detecting regions 70a, 70b1, 70b2, 70c1, 70c2, 71d through 74d by successively selecting them through the signal lines 45b and converting the voltage signals from the detecting regions into digital values.

The rangefinder circuit 46, to which the rangefinder 14 is connected, is supplied with a command signal from the CPU 40 through a signal line 46a for measuring the distance up to the subject. In response to the command signal, the rangefinder 46 controls the rangefinder 14 to measure the distance, in the manner described above. A signal representative of the measured distance is then supplied from the rangefinder circuit 46 through a signal line 46b to the CPU 40.

The CPU 40 supplies a date imprinting trigger signal through a signal line 47a to the date imprinting circuit 47, which marks information including year, month, and date on a frame of the film. The CPU 40 supplies various data items to the LCD control circuit 48 to display camera operating information including photographing and exposure modes, on the LCD 21 that is connected to the LCD control circuit 48. The self-timer lamp 17, the green lamp 22, and the red lamp 23 are controlled by control signals supplied through signal lines 49a from the CPU 40.

The DX contact circuit 50 detects a DX code marked on a film cartridge placed in a cartridge chamber in the camera housing 11 through DX code detector pins in the cartridge chamber, and supplies the detected DX code through signal lines 50a to the CPU 40.

The stroboscopic light integrator 54, which is connected to the stroboscopic flash reflection detector 18, starts integrating reflected light of a stroboscopic flash when a control signal is supplied through a signal line 54a from the CPU 40. The stroboscopic light integrator 54 generates a voltage corresponding to the integrated light and applies the voltage through a signal line 54b to the CPU 40, which controls the stroboscopic circuit 41 to control the stroboscopic flash emission based on the applied voltage.

The CPU 40 is also connected to the main switch 16, the back cover switch 19, the photometric switch 15a and the shutter release switch 15b which are associated with the shutter release button 25, the tele setting switch 10a, the wide setting switch 10b, the mode switch 20, the drive switch 31, the infinity landscape switch 26, and the panoramic picture switch 27a. These switches, except the back cover switch 19 which is turned on when the back cover 80 is closed, are momentary switches which return to their normally open condition when the pressure to close the contacts is removed.

Figure 8:
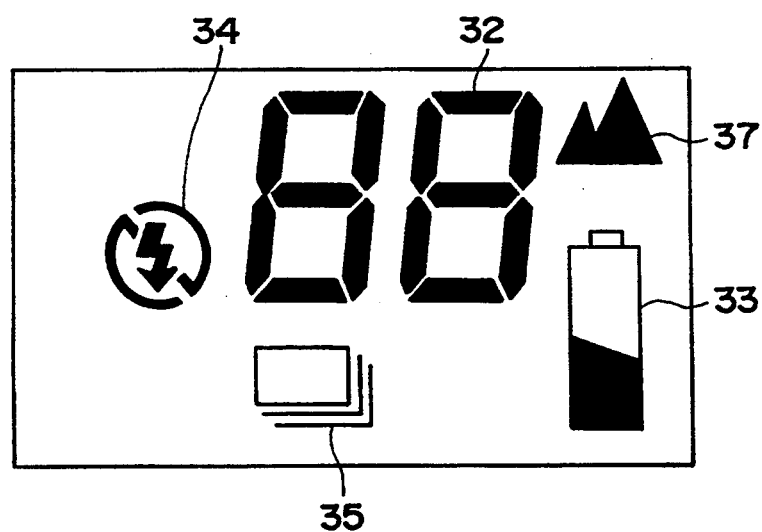
FIG. 8 is a view of an LCD display of the compact camera, showing some of the patterns or marks than can be displayed.

FIG. 8 shows examples of patterns or marks which can be displayed on the LCD 21. As shown in FIG. 8, the LCD 21 includes a film count mark 32 in its central area, a battery condition mark 33 and an infinity landscape mode mark 37 on the right-hand side of the film count mark 32, a stroboscopic flash mark 34 on the left-hand side of the film count mark 32, and a consecutive photographing mode mark 35 below the film count mark 32.

Figure 10:
FIG. 10 is a diagram showing the relationship between photographing modes, drive memory statuses, and symbols or marks displayed on the LCD display.

FIGS. 9 and 10 illustrate symbols or marks that can be displayed on the LCD 21 in combination with certain exposure and photographing modes of the camera.

Each time the mode switch 20 is pressed, the camera sequentially cycles through the following three exposure modes:

(1) automatic mode;
(2) flash-on mode; and
(3) flash-off mode.

Depending on the selected exposure mode, one of the symbols or marks indicated under "DISPLAY" in FIG. 9 is displayed on the LCD 21.

Each time the drive switch 31 is pressed, the camera according to the present invention is toggled between the following two photographing modes:

(1) single-frame shooting mode; and
(2) consecutive shooting mode.

Depending on the selected photographing mode, the symbol indicated under "DISPLAY" in FIG. 10 is displayed on the LCD 21.

Figure 11:
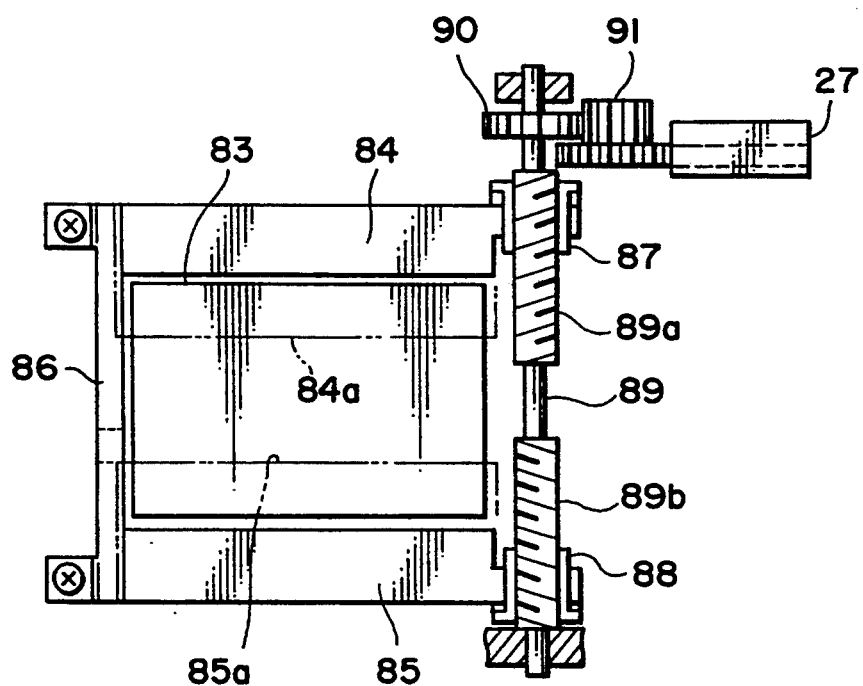
FIG. 11 shows a mechanism for changing the film exposure size from a full picture size to a panoramic picture size.

FIG. 11 shows a mechanism disposed in the camera housing 11 in combination with the zoom lens system, for selecting one of two frame exposure sizes, full picture size or panoramic picture size, depending on the position of the panoramic picture lever 27.

The mechanism includes a pair of vertically spaced light-shielding plates 84, 85 positioned outside of the upper and lower sides of a horizontally elongated aperture frame 83 which defines the full picture size. The light-shielding plates 84, 85 are horizontally longer than the horizontal length of the aperture frame 83. The light-shielding plates 84, 85 slide vertically in a guide plate 86 which is positioned on one side of the aperture frame 83. The light-shielding plates 84, 85 are attached to nuts 87, 88 that are threaded over screws 89a, 89b, respectively. The screws 89a and 89b are supported on a vertical screw shaft 89 which is positioned on the other side of the aperture frame 83 from the guide plate 86. The screw shaft 89 can be rotated about its own axis by the panoramic picture lever 27 through a gear 90 mounted coaxially on the screw shaft 89 and a gear 91 fixed to the panoramic picture lever 27 meshed with gear 90. When the screw shaft 89 is rotated in one direction about its own axis, the light-shielding plates 84, 85 are moved toward each other to cover upper and lower areas of the aperture frame 83 as indicated by the dashed lines 84a, 85a, thus setting the film exposure size to the panoramic picture size.

Operation of the compact camera will be described below with reference to FIGS. 12 through 22. To ensure low power consumption by the compact camera, the CPU 40 starts operating only when there is a starting interrupt initiated by one of the circuits connected to it. Normally, the CPU 40 remains in a low power consumption standby mode. When one of the circuits initiates a starting interrupt, the CPU 40 enters the main routine of operation shown in FIGS. 12 through 14.

Figure 12:
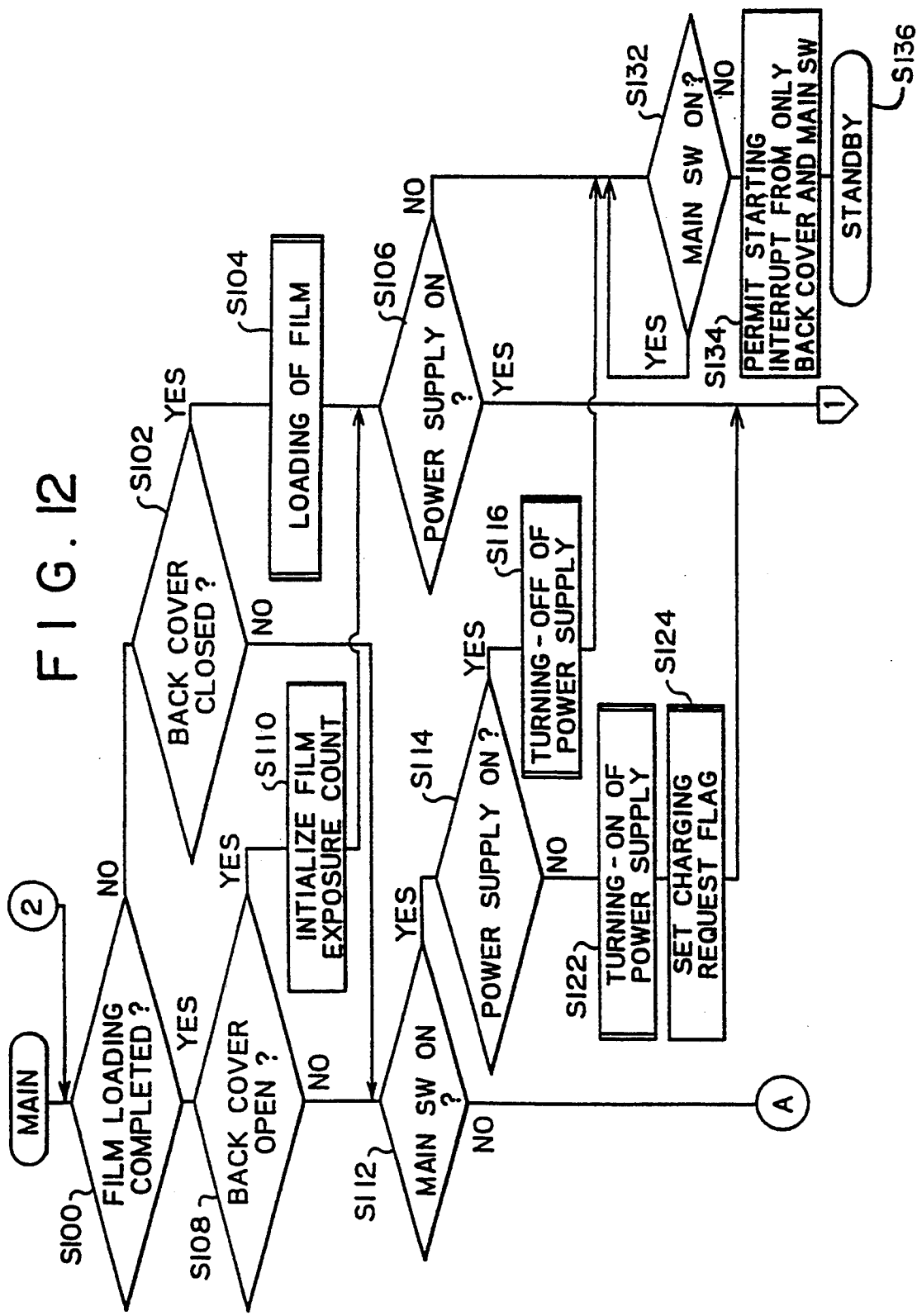
FIGS. 12 through 14 are a flowchart of a main routine of the compact camera.

The CPU 40 enters the main routine as shown in FIG. 12, and determines whether the loading of a film in the camera is completed in step S100. Specifically, the loading of a film in the camera is completed if the cartridge of the film is placed in the cartridge chamber and a certain length of the film (the leader) is wound by the motor 51 of the film transport control circuit 42. If film loading is not completed, then the CPU 40 determines whether the back cover 80 is closed in step S102; if film loading is not completed and the back cover 80 is closed, then the loading of a film in the camera is completed in the manner described above, in step S104. After the film has been loaded, the CPU 40 determines whether the power supply of the camera is turned on in step S106. When the main switch 16 is shifted from the power-off position to the power-on position, the movable zoom lens barrel 13 is extended such that the focal length is 35 mm, (i.e., toward the wide end of the zooming movement), by the zoom lens control circuit 43. The CPU 40 determines the amount to extend the lens by reading the zoom position code.

If the power supply of the camera is turned off in the step S106, then the CPU 40 waits until the contacts of the main switch 16 are opened in response to operation by the user of the main switch 16 in step S132, (i.e., loops until the main switch 16 is turned off). If the main switch 16 is turned off in the step S132, the CPU 40 permits a starting interrupt to be caused by only the back cover switch 19 or the main switch 16 in step S134, and then enters the standby mode in step S136. Therefore, insofar as the power supply of the camera is turned off, the CPU 40 leaves the standby mode and starts to execute the main routine only when the back cover switch 19 is pushed or the main switch 16 is turned on.

If the loading of a film in the camera is completed in step S100, then the CPU 40 determines whether the back cover 80 is open in step S108. If the back cover 80 is open, then the CPU 40 initializes a film exposure count in step S110. Thereafter, control goes to the step S106. If the power supply is not turned on in the step S106, the CPU 40 enters the standby mode after the steps S132 and S134.

If the loading of a film in the camera is not completed in step S100 and the back cover 80 is open in step S102, or if the loading of a film in the camera is completed in step S100 and the back cover 80 is closed in step S108, then the CPU 40 determines whether the main switch 16 is turned on in step S112. If the main switch 16 is turned on in step S112 and the power supply is already on in step S114, then the CPU 40 turns off the power supply in step S116, (i.e., retracts the zoom lens system into the camera housing 11) and prohibits the shutter from being released. Thereafter, the CPU 40 enters the standby mode after the steps S132 and S134.

If the power supply is not already on in step S114, then the CPU 40 turns the power supply on in step S122, (i.e., controls the zoom lens control circuit 43 to project the movable zoom lens barrel 13 toward the position where the focal length thereof is 35 mm), permits the shutter to be released, and initializes the modes, (i.e., sets the photographing mode to the single-frame shooting mode and the exposure mode to the automatic mode).

After the power supply is turned on in step S122, the CPU 40 sets a charging request flag to start charging the capacitor of the stroboscopic flash unit 36 in step S124. As described above, when the power supply is turned on, the exposure mode is initialized to the automatic mode. Therefore, if the capacitor of the stroboscopic flash unit 36 is not charged when the power supply is turned on, then any exposure which requires the stroboscopic flash unit 36 has to be made after the charging of the capacitor is completed. To avoid this time lag, the CPU 40 sets a charging request flag to start charging the capacitor in step S124 immediately after the power supply is turned on. The step S124 is followed by movement of the zoom lens system depending on the operation of the tele and wide setting switches 10a, 10b as described later on with reference to FIG. 14.

Figure 13:
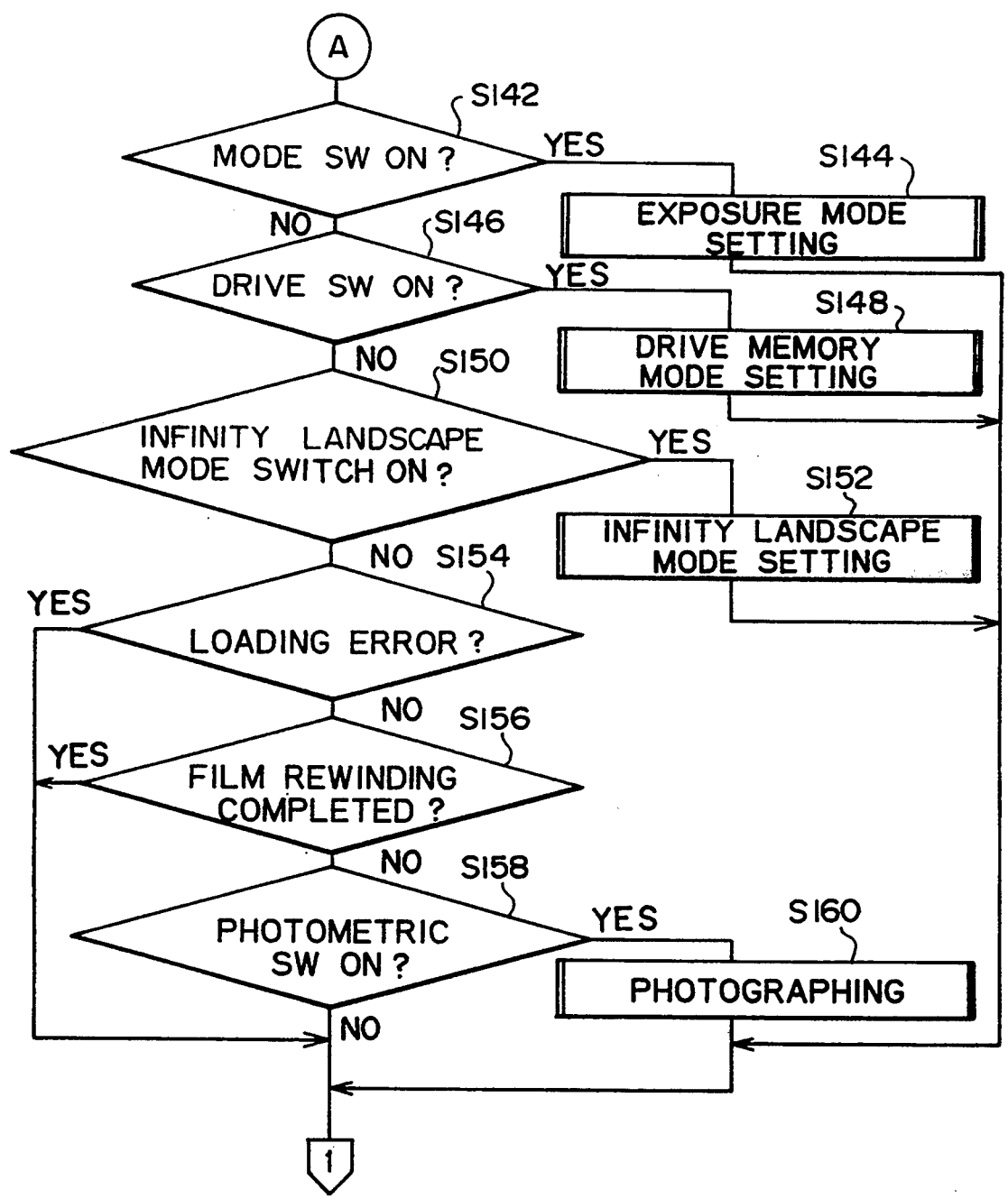

If the main switch 16 is not turned on in step S112, then the CPU 40 determines whether the mode switch 20, the drive switch 31, and the infinity landscape switch 26 are turned on or not in respective steps S142, S146, S150 (see FIG. 13).

If the mode switch 20, the drive switch 31, or the infinity landscape switch 26 is turned on while the power supply is on, the corresponding subroutine is executed in step S144, S148, or S152 respectively. If none of these switches is not turned on, or the photometric switch 15a is turned on in step S158, then the photographing subroutine is executed in step S160.

In the exposure mode setting subroutine in step S144, one of the exposure modes shown in FIG. 9 is selected by operating the mode switch 20. In the exposure mode setting subroutine, the mode memory is incremented by 1 each time the mode switch 20 is pressed, until the memory has a value of 2. If the mode switch 20 is pressed again, the mode memory 20 is cleared and the cycling of the modes is completed.

When the stored data of the mode memory is 0, the automatic mode is selected. When the stored data of the mode memory is 1, the flash-on mode is selected. When the stored data of the mode memory is 2, the flash-off mode is selected.

Figure 15:
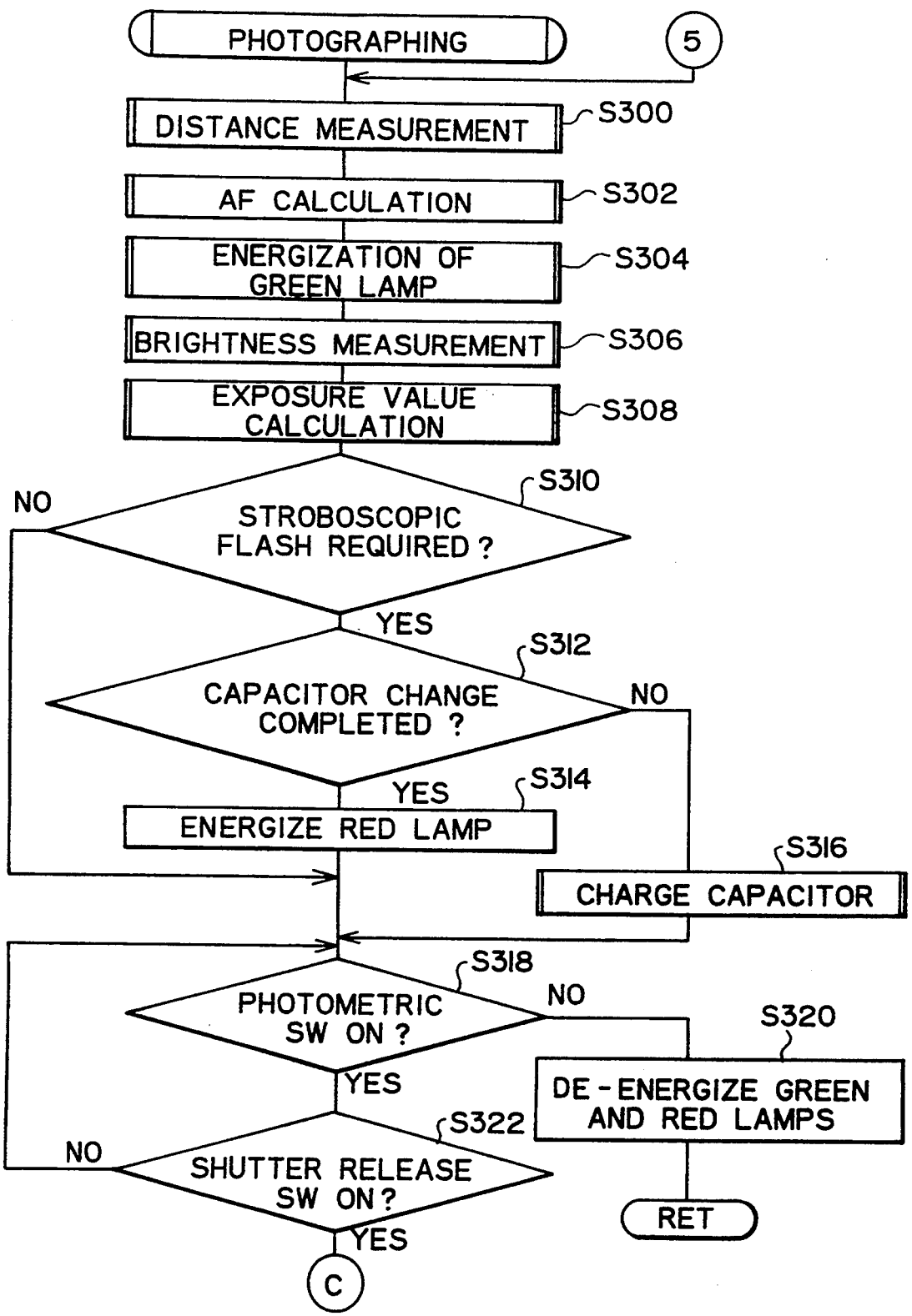
FIGS. 15 and 16 are a flowchart of a photographing subroutine.
Figure 16:
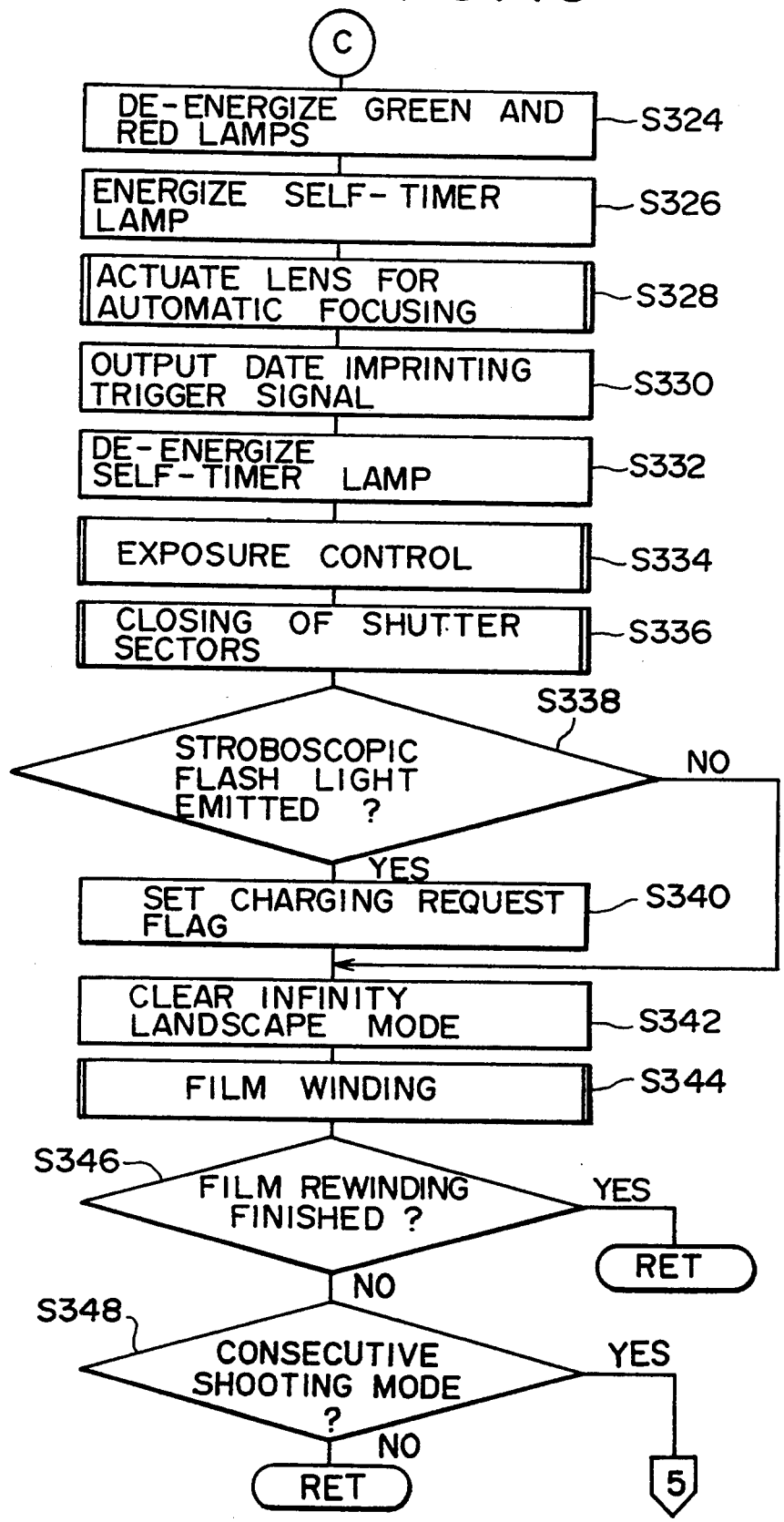

In the drive memory setting subroutine in step S148, the drive memory is toggled between a value of 0 and 1 each time the drive switch 31 is pressed. When the stored data of the drive memory is 0, the single-frame shooting mode is selected. When the stored data of the drive memory is 1, the consecutive shooting mode is selected. The photographing subroutine in step S160, which will be described in detail later with reference to FIGS. 15 and 16, is executed according to the stored data of the drive memory.

Figure 14:
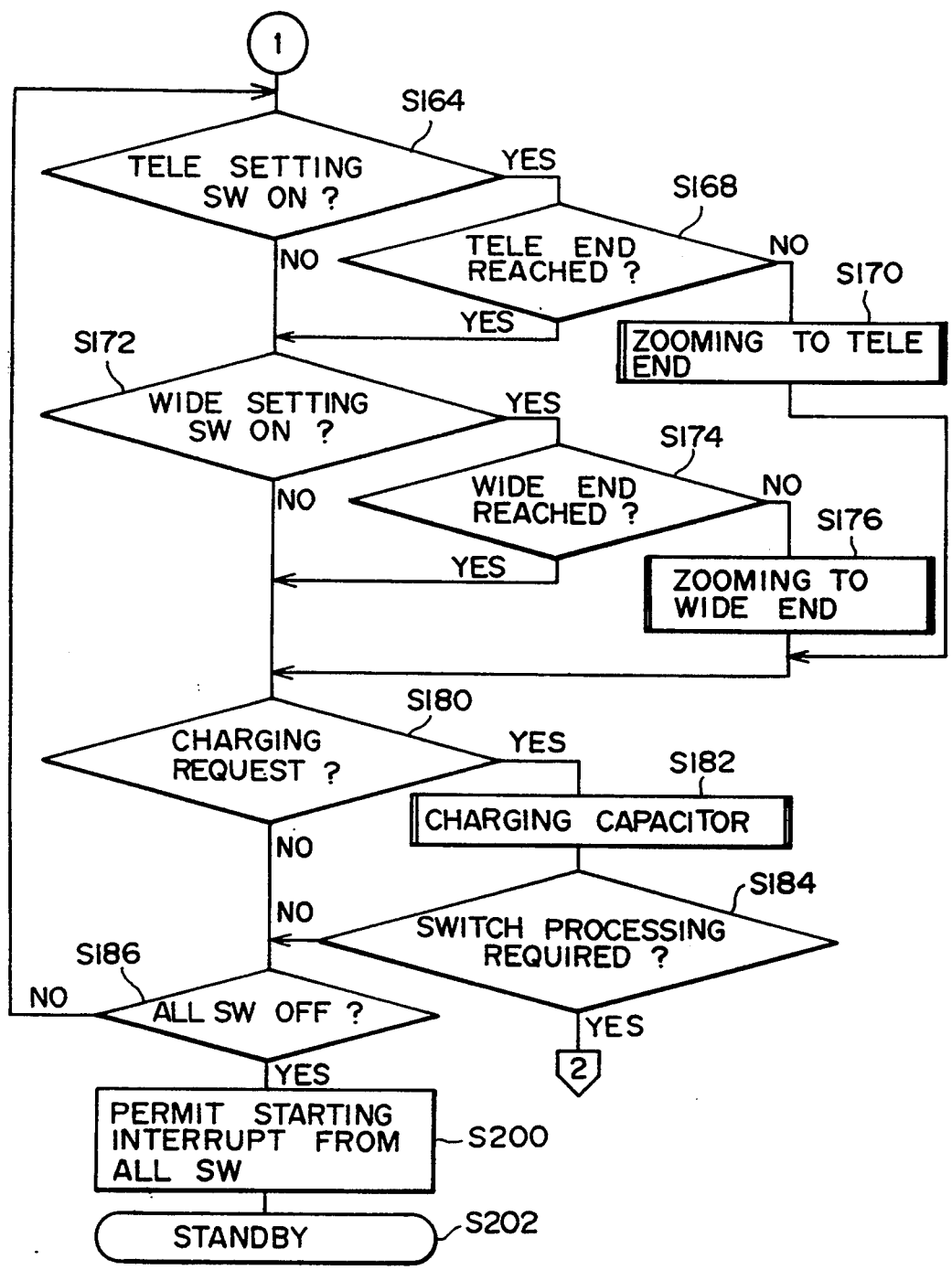

In FIG. 14, the movement of the movable zoom lens barrel 13 is controlled according to whether the tele and wide setting switches 10a, 10b are turned on. Specifically, if the tele setting switch 10a is continuously held on in step S164 and the movable lens barrel 13 has not reached the tele end in step S168, then the CPU 40 controls the zoom lens control circuit 43 to move the movable lens barrel 133 progressively toward the tele end in step S170. Conversely, if the wide setting switch 10b is continuously held on in step S172 and the movable lens barrel 13 has not reached the wide end in step S174, then the CPU 40 controls the zoom lens control circuit 43 to move the movable lens barrel 13 progressively toward the wide end in step S176. If the movable lens barrel 13 has reached the tele end in the step S168, then the movable lens barrel 13 cannot be moved in this direction any further. Similarly, if the movable lens barrel 13 has reached the wide end in step S174, then the movable lens barrel 13 cannot be moved in this direction any further.

After the movable zoom lens barrel 13 has been moved as required, the CPU 40 determines whether there is a request to charge the capacitor of the stroboscopic flash unit 36 based on the charging request flag in step S130. The charging request flag is set immediately after the power supply is turned on or the stroboscopic flash unit 36 has emitted stroboscopic flash light. If the charging request flag is determined as being set in step S180, then the CPU 40 controls the stroboscopic circuit 41 to charge the capacitor of the stroboscopic flash unit 36 in step S182. While the capacitor is being charged, if any of the switches including the mode switch 20, the infinity landscape switch 26, etc. is operated and the associated processing is required in step S184, then the charging of the capacitor is interrupted, and control goes back to the step S100.

In the step S182, the capacitor of the stroboscopic flash unit 36 is charged, and a timer is started. If the voltage across the capacitor being charged reaches a predetermined voltage during the period of time to which the timer has been set, then the CPU 40 clears the charging request flag, and control returns to the main routine. If none of the switches is operated and the associated processing is not required in step S184, then the charging of the capacitor is continued until the capacitor is charged up to the predetermined voltage or the timer runs out. When the capacitor is charged up to the predetermined voltage or the timer runs out, the CPU 40 clears the charging request flag, and then control goes to step S186. If all the switches except the back cover switch 19 are turned off in step S186, then CPU 40 permits a starting interrupt to be caused by all the switches in step S200, and then enters the standby mode in step S202.

The photographing subroutine in step S160 will be described below with reference to FIG. 15. In the photographing subroutine, the CPU 40 executes various subroutines in steps S300, S302, S304, S306, and S308. Specifically, in step 300 the CPU 40 measures the distance up to the subject by way of trigonometric measurement with the rangefinder circuit 46. In step 302, the CPU 40 calculates the distance which the focus lens group has to move in order to automatically focus on the subject. In step S304, the CPU 40 energizes the green lamp 22. In step S306, the CPU 40 measures the brightness of the subject with the six detecting regions 70a, 70b1, 70b2, 70c1, 70c2, 71d through 74d of the photometric sensor 24, and in step S308, the CPU 40 calculates an exposure value.

In the step S304, the CPU 40 energizes the green lamp 22 such that it is continuously lit, after the measurement of the distance up to the subject is finished. If the camera is too close to the subject to focus the focus lens group on the subject, the CPU 40 flashes the green lamp 22 to warn the user that the subject cannot be properly focused by the camera. In the step S308, the required exposure value in the selected exposure mode is calculated based on the measured distance up to the subject, the measured brightness of the subject, etc.

Based on the calculated exposure value and the selected modes, the CPU 40 determines whether the stroboscopic flash unit 36 is required to enable proper exposure in step S310. If the emission of stroboscopic flash light is required, and if the capacitor of the stroboscopic flash unit 36 has been charged up to the predetermined voltage in step S312, then the CPU 40 energizes the red lamp 23 to be continuously lit to indicate the completion of the charging of the capacitor. If the charging of the capacitor of the stroboscopic flash unit 36 is not completed, then the CPU 40 charges the capacitor in step S316. In the step S316, the CPU 40 energizes the red lamp 23 to flash to indicate to the user that the capacitor is being charged. When the charging of the capacitor is completed, the CPU 40 energizes the red lamp 23 to be continuously lit.

If the photometric switch 15a is turned on, (i.e., if the shutter release button 25 is partially depressed), in step S318, then the CPU 40 loops until the shutter release switch 15b is turned on in step S322. If the photometric switch 15a is turned off while the CPU 40 is looping, then the CPU 40 de-energizes the green lamp 22 and the red lamp 23, finishing the photographing subroutine, and control returns to the main routine.

If the shutter release button 25 is fully depressed and the shutter release switch 15b is turned on in step S322, then the CPU 40 de-energizes the green lamp 22 and the red lamp 23 in step S324. Thereafter, the CPU 40 energizes the self-timer lamp 17 in step S326 to indicate that a frame is about to be exposed. Then, the CPU 40 actuates the focus lens group to automatically focus on the subject, in step S328. The CPU 40 outputs a date imprinting trigger signal to the date imprinting circuit 47 to mark date information on a frame of the film in step S330.

When the actuation of the lens is completed, the CPU 40 de-energizes the self-timer lamp 17 in step S332, and then executes an exposure control subroutine in step S334. In the exposure control subroutine (see also FIG. 17), the shutter sectors start to open, the film frame is exposed based on the exposure value calculated in step S308, and the stroboscopic flash unit 36 is energized to emit stroboscopic flash light, if necessary. When the shutter sectors are closed to finish the exposure in step S336, the CPU 40 determines whether stroboscopic flash light has been emitted in step S338. If stroboscopic flash light has been emitted, then the CPU 40 sets the charging request flag in step S340.

Then, the CPU 40 clears the infinity landscape mode in step S342, and winds the film in step S344. The CPU 40 clears the infinity landscape mode each time a photographing process is finished because it is unlikely for exposures to be made consecutively in the infinity landscape mode and also because if exposures were made without clearing the infinity landscape mode it would be possible for them to be out of focus.

In the event that the trailing end of the film is detected while the film is being wound in step S344, the film is automatically rewound. If the film rewinding is finished in step S346, then the photographing subroutine is finished, and control goes back to the main routine. If the film is wound in step S344 but the film rewinding is not finished in step S346, then the CPU 40 determines whether the consecutive photographing mode is selected or not based on the data stored in the drive memory in step S348. If the consecutive shooting mode is selected, then control returns to the step S300 in FIG. 15. If the consecutive shooting mode is not selected, then the photographing subroutine is finished and control goes back to the main routine. No film winding is carried out if no film is loaded in the cartridge chamber in the camera housing 11.

Figure 17:
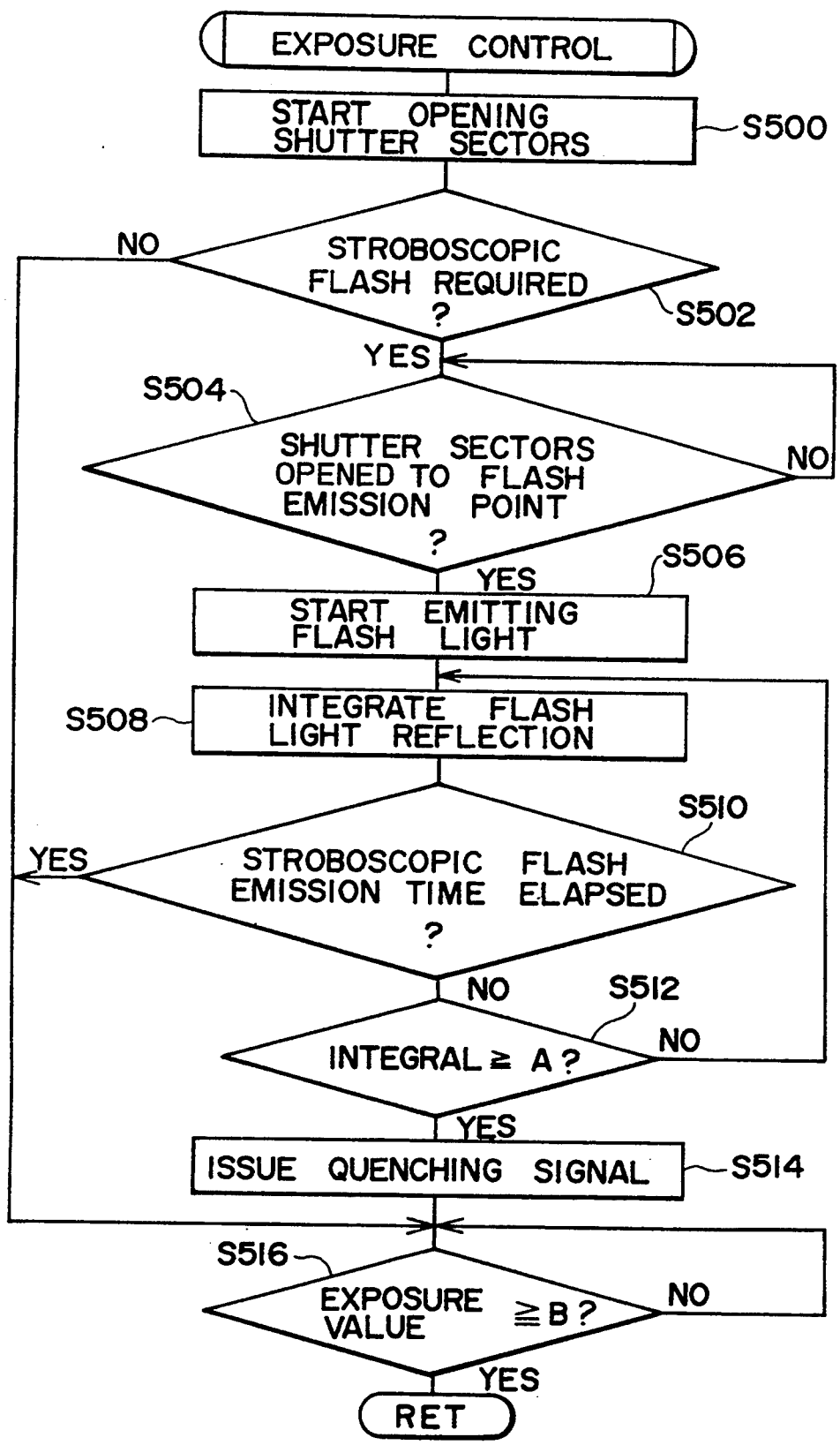
FIG. 17 is a flowchart of an exposure control subroutine.

FIG. 17 is a flowchart of the exposure control subroutine in step S334 of the photographing subroutine. The compact camera illustrated here can effect a flashmatic process, i.e., automatically adjust the diaphragm and the flash timing depending on the distance up to the subject for optimum exposures. The flash timing is adjusted by determining the emission of flash light from the stroboscopic flash unit 36 somewhere during the period of time from the closing moment to the opening moment of the shutter sectors.

When the exposure control subroutine is called, the shutter sectors start opening in step S500. If the stroboscopic flash unit 36 is required to emit flash light in step S502, then the CPU 40 waits until the shutter sectors are opened to a position corresponding to a predetermined flash emission point in step S504. If the shutter sectors are opened to that position, then the CPU 40 controls the stroboscopic circuit 41 to energize the stroboscopic flash unit 36 to start emitting flash light in step S506. The CPU 40 also controls the stroboscopic light integrator 54 to integrate the reflection, falling on the stroboscopic flash reflection detector 18, of the flash light from the subject in step S508. Until the period of time (stroboscopic flash emission time) during which the flash light is emitted from the stroboscopic flash unit 36 elapses in step S510, the CPU 40 monitors the integral of the reflection to determine whether or not it is equal to or greater than a predetermined value A in step S512.

If the integral exceeds the predetermined value A in step S512, then the CPU 40 issues a quenching signal to de-energize the stroboscopic flash unit 36 in step S512. Thereafter, the CPU 40 waits until the exposure value is equal to or greater than a,predetermined value B in step S516, after which the exposure control subroutine is finished, and control returns to the photographing subroutine (see FIGS. 15 and 16). If the stroboscopic flash unit 36 is not required to emit flash light in step S502, or if the stroboscopic flash emission time elapses in step S510, then control jumps from the step S502 or S510 to the step S516.

Figure 18:
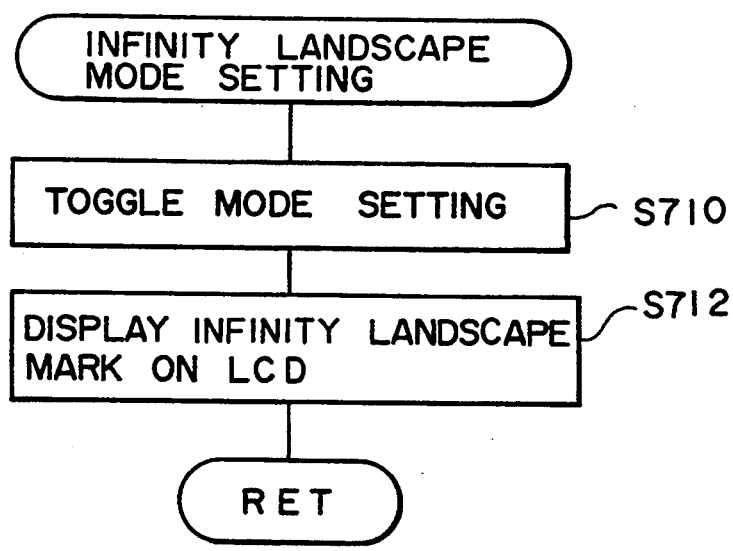
FIG. 18 is a flowchart of a infinity landscape setting subroutine.

FIG. 18 shows the infinity landscape setting subroutine in step S152 of the main routine. In the infinity landscape setting subroutine, the infinity landscape mode is toggled on and off in step S710. When the CPU 40 turns on the infinity landscape mode, the CPU 40 controls the LCD control circuit 48 to display the infinity landscape mark on the LCD 21, and when the CPU 40 turns off the infinity landscape mode, the CPU 40 controls the LCD control circuit 48 to turn off the infinity landscape mark in step S712. Thereafter, control returns to the main flow.

FIGS. 19 through 22 show a flowchart of the subroutine of calculating an exposure value in step S308 of the photographing subroutine.

In the subroutine shown in FIGS. 19 through 22, Bva, Bvb1, Bvb2, Bvc1, Bvc2, and Bvd represent the brightnesses of the subject which are detected by the respective detecting regions 70a, 70b1, 70b2, 70c1, 70c2, 71d through 74d of the photometric sensor 24.

Figure 19:
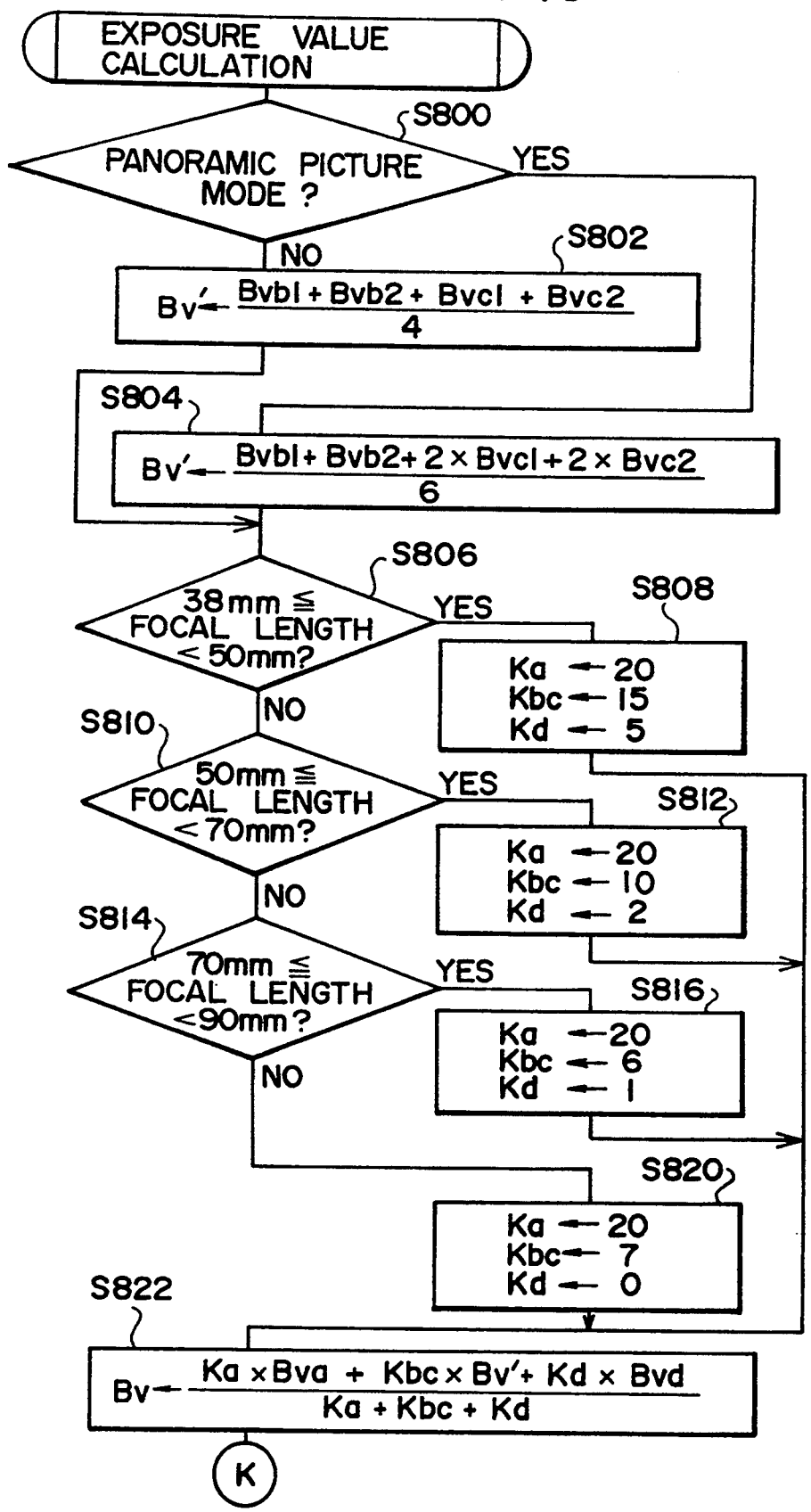
FIG. 19 is a flowchart of a process of calculating the corrected brightness of a subject in an exposure value calculating subroutine.

FIG. 19 shows a process of calculating the corrected brightness of the subject in the exposure value calculating subroutine. As shown in FIG. 19, the CPU 40 determines whether the panoramic picture lever 27 is operated, selecting the panoramic picture mode, or not in step S800. If the panoramic picture mode is not selected, then the CPU 40 calculates the average Bv' of the brightnesses Bvb1, Bvb2, Bvc1, and Bvc2 of the subject which are detected by the detecting regions 70b1, 70b2, 70c1, and 70c2 according to the equation:

$$Bv' = (Bvb1 + Bvb2 + Bvc1 + Bvc2)/4$$

in step S802. If the panoramic picture mode is selected, then the CPU 40 calculates the average B' of the brightnesses Bvb1, Bvb2, Bvc1, and Bvc2 of the subject which are detected by the detecting regions 70b1, 70b2, 70c1, and 70c2 according to the equation:

$$Bv' = (Bvb1 + Bvb2 + 2 \times Bvc1 + 2 \times Bvc2)/6$$

in step S804. In step S804, since an aperture which defines the panoramic picture size is horizontally elongated, the brightnesses Bvc1, Bvc2 detected by the detecting regions 70c1, 70c2 which are positioned in respective left and right areas of the photometric range are multiplied by a weighting coefficient "2", and then the brightnesses Bvb1, Bvb2 and the weighted brightnesses Bvc1, Bvc2 are averaged. That is, the average Bv of the brightnesses Bvb1, Bvb2, Bvc1, and Bvc2 detected by the detecting regions 70b1, 70b2, 70c1, and 70c2 is determined from an elliptical or circular brightness distribution depending on whether the panoramic picture mode is selected or not. The weighting coefficient given above is not limited to 2, and thus other values may be used depending on the characteristics of the photometric sensor, such as linearity and saturation.

Then, the brightness average Bv' is multiplied by a multiplier Kbc, the brightness Bva by a multiplier Ka, and the brightness Bvd by a multiplier Kd, and the average Bv of the products is determined according to the equation:

$$Bv(Ka \times Bva + Kbc \times Bv' + Kd \times Bvd)/(Ka + Kbc + Kd)$$

in step S822. The multipliers Kbc, Ka, and Kd in step S822 are determined in steps S808, S812, S816, S820 depending on the present focal length of the zoom lens system which is determined by the code signal corresponding to the position of the zoom lens system and supplied from the zoom lens control circuit 43.

More specifically, if the focal length of the zoom lens system is equal to or greater than 38 mm and smaller than 50 mm in step S806, then the multipliers Ka, Kbc, Kd are set to 20, 15, 5, respectively, in step S808. If the focal length of the zoom lens system is equal to or greater than 50 mm and smaller than 70 mm in step S810, then the multipliers Ka, Kbc, Kd are set to 20, 10, 2, respectively, in step S812. If the focal length of the zoom lens system is equal to or greater than 70 mm and smaller than 90 mm in step S814, then the multipliers Ka, Kbc, Kd are set to 20, 6, 1, respectively, in step S816. If the focal length of the zoom lens system is equal to or greater than 90 mm in step S814, then the multipliers Ka, Kbc, Kd are set to 20, 7, 0, respectively, in step S820. These coefficients are not limited to the numbers above but can be varied depending on the characteristics of the optical system and the photometric system.

The brightness average Bv detected by the photometric sensor 24 is calculated using the multipliers Kbc, Ka, and Kd thus determined, the brightnesses Bva, Bvd, and the brightness average Bv' in step S822. In this manner, the measured brightness of the subject is corrected as the angle of view varies with the zooming movement of the zoom lens system. The multipliers Ka, Kbc, and Kd are not limited to the above numerical values, but may be of any numerical values insofar as they take into account the ratio of the areas occupied by the detecting regions 70a, 70b1, 70b2, 70c1, 70c2, 71d through 74d in the effective photometric range to the exposure range of the subject as it varies with the zooming movement of the zoom lens system.

In the flowchart shown in FIG. 19, the multipliers Ka, Kbc, Kd are determined in four combinations. However, they may be determined in a greater number of combinations for correcting the measured brightness of the subject in a larger number of steps corresponding to a larger number of focal length ranges.

Figure 20:
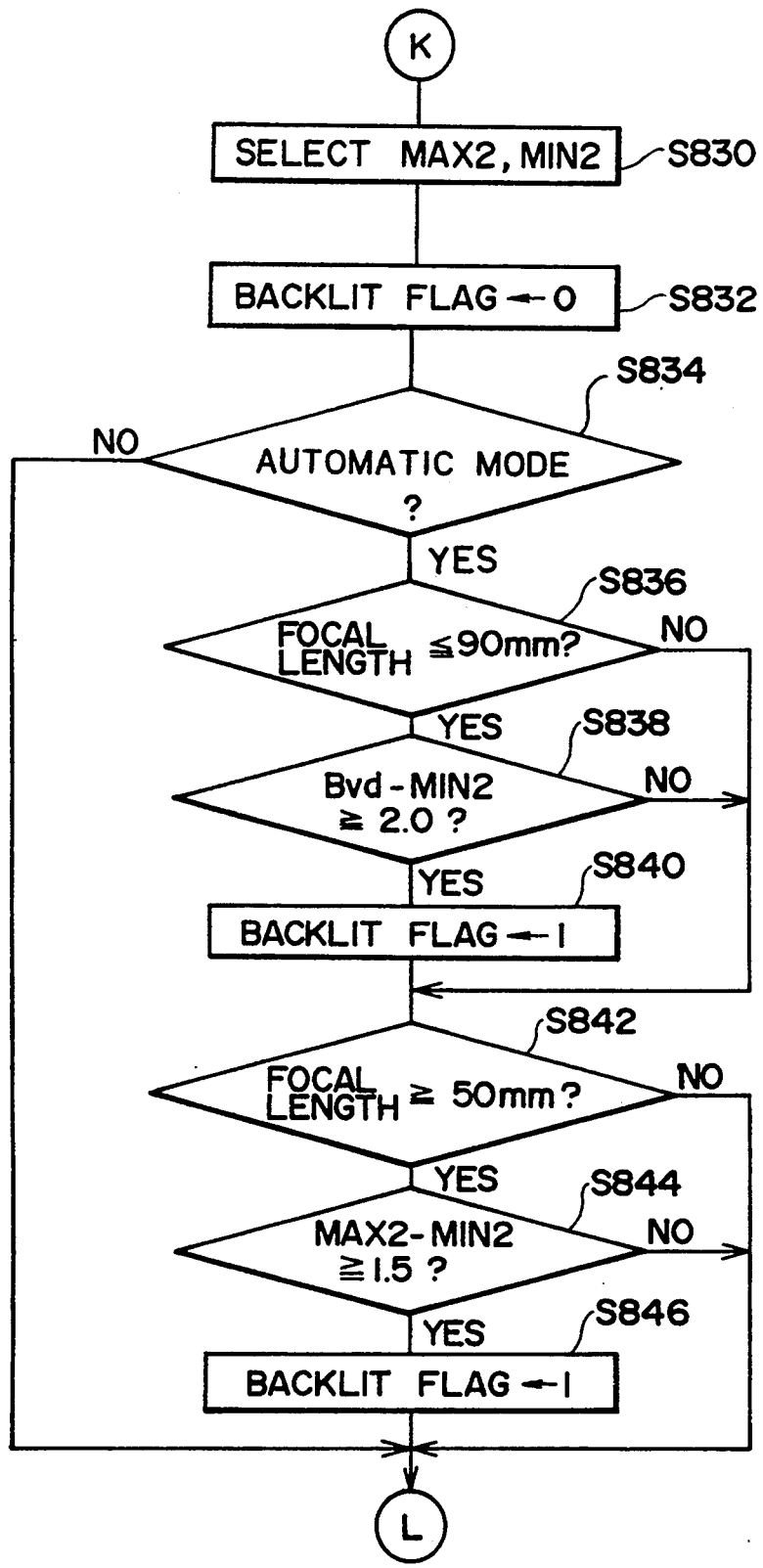
FIG. 20 is a flowchart of a process of detecting the subject against the light in the exposure value calculating subroutine.

FIG. 20 shows a process for metering a backlit subject, to determine the correct exposure value.

As shown in FIG. 20, the second highest and second lowest brightnesses Bva, Bvb1, Bvb2, Bvc1, and Bvc2 (brightness Bvd is not included) are selected (i.e., MAX2 and MIN2). MIN2 is selected to represent the brightness of a subject, since the lowest brightness would usually be attributed to the shadowed area in front of a subject. Similarly, MAX2 is selected to represent the brightness of the background, since the brightest region may be attributed to a light source, and thus be an erroneous value. After the representative brightnesses MAX2, MIN2 are selected, a backlit flag is cleared to "0" in step S832.

Then, the CPU 40 determines in step S834 whether the automatic mode has been selected by the mode switch 20 in the exposure mode setting subroutine in step S144. If the automatic mode has not been selected, the control jumps to step S850 (see FIG. 21).

If the automatic mode has been selected, then control proceeds to step S836. If the focal length of the zoom lens system is equal to or smaller than 90 mm in step S836, and the difference between brightness Bvd and MIN2 is greater than or equal to 2.0, then the backlit flag is set (i.e., made 1) and control moves to step S842. Otherwise the backlit flag remains cleared.

Figure 21:
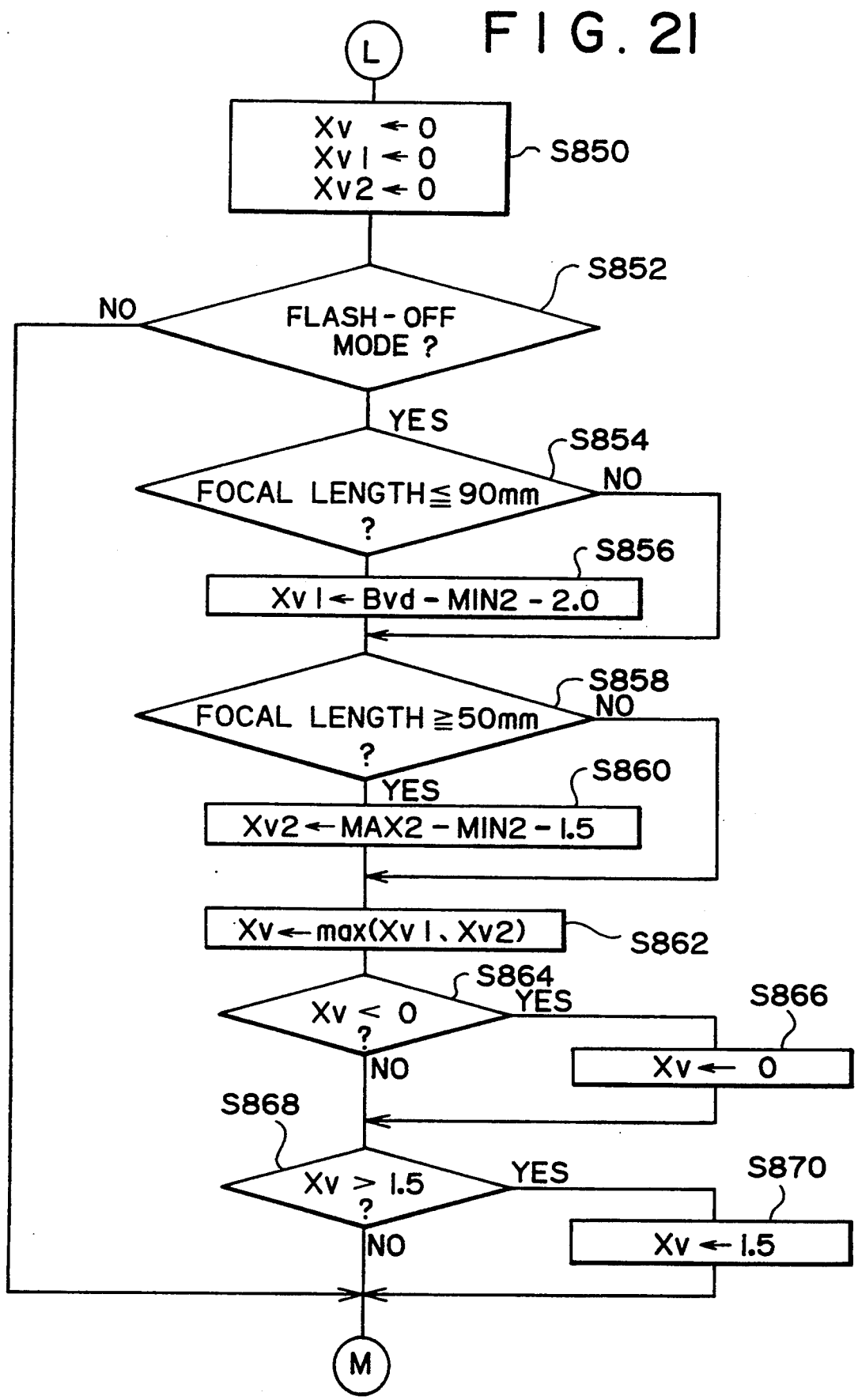
FIG. 21 is a flowchart of a process of calculating an exposure corrective value in the exposure value calculating subroutine.
Figure 22:
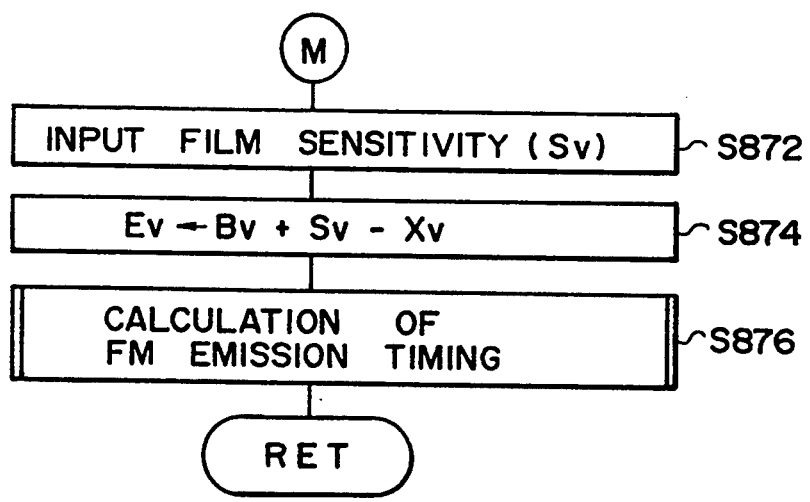
FIG. 22 is a flowchart of a process of calculating an exposure value in the exposure value calculating subroutine.

If the focal length is greater than or equal to 50 mm, and the difference between brightness MAX2 and MIN2 is greater than or equal to 1.5, then the backlit flag is set to 1, and control advances to step S850, as shown in FIG. 21. Otherwise the backlit flag remains unchanged from it setting at step S842. Therefore, if the focal length is smaller than 50 mm and therefore a wide angle setting, then the CPU 40 determines that the subject is backlit if the difference between the peripheral brightness areas Bvd and the second lowest brightness (and thus the brightness of the subject) MIN2 is greater than or equal to 2.0. If the focal length is greater than or equal to 90 mm and therefore a telephoto setting, then the CPU 40 determines that the subject is backlit if the difference between the background brightness MAX2 and the subject brightness MIN2 is greater than or equal to 1.5. If the focal length is between 50 mm and 90 mm and therefore a moderately zoomed setting, then the subject is judged to be backlit if either of the above conditions is met. If none of these conditions are met, then the subject is not backlit.

The conditions for determining whether the subject is backlit are not limited to those described above, but may be established from the ratio of the photometric range of the photometric sensor 24 to the area corresponding to a frame that is exposed. This ratio varies with the zooming movement of the zoom lens system and also the ratios of the surface areas of the detecting regions 70a, 70b1, 70b2, 70c1, 70c2, 71d through 74d, to the surface area of the entire photodetector surface of the photometric sensor 24.

The decision steps are not limited to the two steps S838, S844, but may be a greater number of steps which cover a greater number of focal length ranges.

FIG. 21 shows a process of automatically correcting an exposure value in the exposure value calculating subroutine when the flash-off mode is selected.

In step 850, the CPU 40 first clears an exposure corrective value Xv and working buffers Xv1, Xv2 and advances control to step S852. If the flash-off mode is selected then control advances to step S854, otherwise control advances to step S872.

If the focal length is less than or equal to 90 mm, the buffer Xv1 is stored with a value that is dependent on the peripheral brightness Bvd, the subject brightness MIN2 and the backlit threshold 2.0, and is given by the following equation:

$$Xv1 = Bvd - MIN2 - 2.0.$$

Xv1 will therefore be positive if the subject is backlit or negative otherwise. Control then advances to step S858.

If the focal length is greater than or equal to 50 mm, the buffer Xv2 is stored with a value that is dependent on the background brightness MAX2, the subject brightness MIN2 and the backlit threshold 1.5, and is given by the following equation:

$$Xv2 = MAX2 - MIN2 - 1.5$$

Xv2 will therefore be positive if the subject is backlit or negative otherwise. Control then advances to step S862.

Step S862 determines the exposure correction value Xv will be the larger of Xv1 or Xv2. However, if the focal length is less than 50 mm, and thus a wide angle setting, the value Xv2 is not determined above, and therefore the value Xv equal to Xv1. Similarly, if the focal length is greater than 90 mm and thus a telephoto setting, the value Xv1 is not determined, and therefore the value Xv is equal to Xv2. If the focal length is between 50 mm and 90 mm, then Xv is the larger of Xv1 and Xv2, as shown in step S862. Control then advances to step S864.

If Xv is negative, then Xv is set to 0 and control advances to step S868. If Xv is greater than 1.5, then Xv is set to 1.5, otherwise the value of Xv remains unchanged. Control then advances to step S872 shown in FIG. 22.

The same thresholds used in the automatic mode are used in the flash-off mode, however these thresholds are not limited to the numerical values described above, and can be different for the two modes. Further, more focal length ranges than the two illustrated ranges may be employed to produce a greater number of data items that can be used to determine the exposure corrective value Xv.

The value Ev used to set the proper exposure is dependent on the weighted average brightness Bv, the exposure corrective value Xv and the film sensitivity (corresponding to the film speed) Sv, and is given by the following equation:

$$Ev = Bv + Sv - Xv$$

as shown in step S874. Control then advances to step S876 where calculation of flashmatic (FM) emission timing is determined.

Therefore, when the automatic mode is selected, only the weighted average brightness value Bv of the photometric sensor and the film sensitivity Sv are used to determine the exposure value. If the subject is deemed to be backlit, then the flash will be used, but no exposure corrective value is required.

If the flash-off mode is selected, and the subject is deemed to be backlit, the exposure value Ev is determined from the weighted average brightness Bv, the film sensitivity SV, and the exposure corrective value Xv.

Further, the weighted average brightness Bv takes into consideration whether the full picture size mode or the panoramic picture mode is selected. Then the weighting coefficients are determined according to the focal length of the zoom lens. Thus, the effective area that is metered closely resembles the area that is to be photographed, and an accurate exposure value can be determined.

Similarly, the backlit condition is determined by taking into consideration the focal length of the zoom lens and adjusting the criteria used to judge whether this condition is met. This results in accurate determination of the backlit condition, and proper use of the flash. Further, in the situations where the flash cannot be used (such as in a theater, or photographing landscapes), an exposure corrective value is determined to correct the exposure if the backlit condition exists. This value is also dependent on the focal length of the zoom lens, and thus is accurately determined no matter what focal length is being used.

Depending on the selected exposure mode, a minimum value may be established with respect to the exposure value Ev that is calculated in step S874.

The number of detecting regions of the photometric sensor 24 is not limited to "6". Rather, the photodetector surface of the photometric sensor 24 may be divided into a greater number of detecting regions or a smaller number of detecting regions. The detecting regions 70a, 70b1, 70b2, 70c1, 70c2, 70d1 through 70d4 are not limited to the illustrated surface areas, but may have larger or smaller surface areas.

A compact camera having a zoom lens whose focal length is continuously variable has been described here. However, the present invention may be applied to compact cameras which have a lens system where the focal length does not change continuously but where predetermined focal lengths may be selected.

The present disclosure relates to subject matters contained in Japanese Patent Applications Nos. HEI 4-343357, filed on Nov. 30, 1992, HEI 4-343358, filed on Nov. 30, 1992, and HEI 4-343359, filed on Nov. 30, 1992 which are expressly incorporated herein by reference in their entirety.

What is claimed is:

1. A compact camera comprising:
   a photographing optical system, the focal length of which is variable over a certain range;
   a photometric system having a plurality of segments, each segment outputting a brightness level, said photometric system separate from said photographing optical system; and
   control means to determine an exposure value, said control means using weighting coefficients to calculate a weighted average of said brightness levels outputted by said plurality of segments, said coefficients varying according to said focal length of said optical system, said average brightness level used to determine said exposure value.

2. The compact camera according to claim 1 wherein said plurality of segments are arranged such that a segment is located in a position corresponding to a central portion of a photographing frame, a first group of said segments arranged outside a perimeter of said central segment, and a second group of said segments arranged outside a perimeter of said first group of segments, said segments of said first and second groups aligned vertically and horizontally in a substantially rectangular pattern.

3. The compact camera according to claim 2 which further comprises a selection means for selecting between a full size photographic aperture and a panoramic size photographic aperture, and wherein for said first group of segments a ratio of said weighting coefficients for said vertically aligned segments to said weighting coefficients for said horizontally aligned segments is larger when said panoramic size photographic aperture is selected, than when said full size photographic aperture is selected.

4. The compact camera according to claim 1 wherein said range of focal lengths is divided into a plurality of focal length ranges, each of said focal length ranges having predetermined weighting coefficients, said predetermined weighting coefficients common to all focal lengths that are within each of said focal length ranges.

5. The compact camera according to claim 4 wherein a ratio of said weighting coefficient for said central segment to said weighting coefficients for said first and second group of segments increases as said focal length increases.

6. The compact camera according to claim 1 wherein said control means:
   selects a predetermined number of said weighting coefficients, said weighting coefficients having values that are based on said focal length of said photographing optical system; and
   calculates a weighted average of products of each of said brightness levels multiplied by one of said weighting coefficients, to give said weighted average brightness level.

7. The compact camera according to claim 6 wherein said control means further comprises brightness selection means to select a second highest brightness level corresponding to a background brightness level and a second lowest brightness level corresponding to a subject brightness level.

8. The compact camera according to claim 7 which further comprises a flash mode selection means that selects between an automatic mode and a flash-off mode, wherein when said selection means selects said automatic mode said control means further determines whether a subject is backlit by examining said focal length, said selected brightness levels, another of said brightness levels and backlit threshold levels.

9. The compact camera according to claim 7 which further comprises a flash mode selection means that selects between an automatic mode and a flash-off mode, wherein when said selection means selects said flash-off mode said control means further determines an exposure corrective value by examining said focal length, said selected brightness levels, another of said brightness levels and backlit threshold levels.

10. The compact camera according to claim 9 wherein said control means further calculates said exposure value based on said weighted average brightness level and said exposure corrective value average.

11. A compact camera comprising:
a photographing optical system which has a plurality of focal lengths;
a photometric system having a plurality of segments, each segment outputting a brightness level, said photometric system separate from said photographing optical system;
brightness selection means to select a first predetermined number of brightness levels having predetermined characteristics; and
control means to determine an exposure value, said control means further determining whether a subject is backlit by examining said focal length, said selected brightness levels, and backlit threshold levels.

12. The compact camera according to claim 11 wherein said first predetermined number is three, and said brightness levels correspond to a second lowest brightness level representing a subject brightness level, a second highest brightness level representing a background brightness level and a peripheral brightness level.

13. The compact camera according to claim 11 wherein said control means uses weighting coefficients to calculate a weighted average of said brightness levels outputted by said plurality of segments, said coefficients varying according to said focal length of said optical system, said weighted average brightness level used to determine said exposure value.

14. The compact camera according to claim 13 wherein said control means:
selects a second predetermined number of said weighting coefficients, said weighting coefficients having values that are based on said focal length of said photographing optical system; and
calculates a weighted average of products of each of said brightness levels multiplied by one of said weighting coefficients, to give said weighted average brightness level.

15. A compact camera comprising:
a photographing optical system, the focal length of which is variable over a certain range;
a photometric system having a plurality of segments, each segment outputting a brightness level, said photometric system separate from said photographing optical system;
brightness selection means to select a first predetermined number of brightness levels having predetermined characteristics; and
control means to determine an exposure value, said control means further determining an exposure corrective value by examining said focal length, said selected brightness levels, and backlit threshold levels.

16. The compact camera according to claim 15 wherein said first predetermined number is three, and said brightness levels correspond to a second lowest brightness level representing a subject brightness level, a second highest brightness level representing a background brightness level and a peripheral brightness level.

17. The compact camera according to claim 15 wherein said control means uses weighting coefficients to calculate a weighted average of said brightness levels outputted by said plurality of segments, said coefficients varying according to said focal length of said optical system, said weighted average brightness level used to determine said exposure value.

18. The compact camera according to claim 17 wherein said control means:
selects a second predetermined number of said weighting coefficients, said weighting coefficients having values that are based on said focal length of said photographing optical system; and
calculates a weighted average of products of each of said brightness levels multiplied by one of said weighting coefficients, to give said weighted average brightness level.

19. The compact camera according to claim 18 wherein said control means further calculates said exposure value based on said weighted average brightness level and said exposure corrective value average.

20. A compact camera comprising:
a zoom lens system for focusing on a subject, said zoom lens system having a variable focal length;
photometric means, separate from said zoom lens system, said photometric means comprising a plurality of photoelectric transducer regions, each of said photoelectric transducer regions output a brightness level corresponding to light reflected by a subject; and
control means for multiplying said brightness levels by weighting coefficients, said weighting coefficients depending on said variable focal length of the zoom lens system, to calculate an average brightness, and determine an exposure value according to said calculated average brightness.

21. The compact camera according to claim 20, further comprising means for switching between a full picture mode and a panoramic picture mode, said weighting coefficients being different depending on whether said full or panoramic picture mode is selected.

22. The compact camera according to claim 20, wherein said variable focal length is divided into a plurality of focal length ranges.

23. A compact camera comprising:
a zoom lens system for focusing on a subject, said zoom lens system having a variable focal length;

photometric means, separate from said zoom lens system, said photometric means comprising a plurality of photoelectric transducer regions, each of said photoelectric transducer regions output a brightness level corresponding to light reflected by a subject; and selecting means for selecting photoelectric transducer regions which fall in an effective photometric range, said photometric range dependent on said variable focal length, said selection means further selects photoelectric transducer regions which represent bright and dark areas of light reflected by said subject; and control means for determining that said subject is backlit, said control means activating a stroboscopic flash when a difference in brightness level between said bright and dark areas is equal to or greater than a predetermined threshold level, said threshold level dependent on said variable focal length.

24. The compact camera according to claim 23, wherein said variable focal length is divided into a plurality of focal length ranges.

25. A compact camera comprising:
a zoom lens system for focusing on a subject, said zoom lens system having a variable focal length;
photometric means, separate from said zoom lens system, said photometric means comprising a plurality of photoelectric transducer regions, each of said photoelectric transducer regions output a brightness level corresponding to light reflected by a subject; and
selecting means for selecting photoelectric transducer regions which fall in an effective photometric range, said photometric range dependent on said variable focal length, said selection means further selects photoelectric transducer regions which represent bright and dark areas of light reflected by said subject; and
control means for calculating an exposure corrective value based on said brightness levels of said selected photoelectric transducer regions and a predetermined value that depends on said variable focal length.

26. The compact camera according to claim 25, wherein said variable focal length is divided into a plurality of focal length ranges.

27. The compact camera according to claim 25, further comprising means for correcting an exposure value with said exposure corrective value.

28. The compact camera according to claim 25, wherein said control means comprises means for limiting said exposure corrective value to upper and lower limits.

29. A compact camera comprising:
a photographing optical system, said photographing optical system selectively defining at least two focal lengths;
a photometric system having a plurality of segments, each segment outputting a brightness signal, said photometric system separate from said photographing optical system;
control means for determining an exposure value, based on a predetermined combination of said plurality of brightness signals; and
means for selecting a predetermined combination of said brightness signals in accordance with an occurrence of a predetermined condition of said camera.

30. The compact camera according to claim 29, further comprising means for selecting a focal length of said photographing optical system, said predetermined condition comprising selection of a predetermined focal length of said photographic optical system by said focal length selecting means.

31. The compact camera according to claim 29, said photographing optical system comprising a zoom lens system, a focal length of said zoom lens photographing optical system being variable over a predetermined range, said predetermined condition comprising movement of said zoom lens to a predetermined focal length within said predetermined range of focal lengths.

32. The compact camera according to claim 29, further comprising size selection means for selecting between a full size photographic aperture and a panoramic size photographic aperture, said predetermined condition comprising selection of a photographic aperture size by said size selection means.

33. The compact camera according to claim 32, said predetermined combination selecting means selecting different weighting coefficients for selected ones of said brightness signals in accordance with selection by said size selection means of a photographic aperture size.

34. The compact camera according to claim 29, further comprising focal length selecting means for selecting a focal length of said photographing optical system and said means for selecting a predetermined combination comprising means for assigning weighting coefficients to said brightness signals in accordance with a focal length of said photographing optical system.

35. The compact camera according to claim 34, wherein a ratio of said weighting coefficients for a brightness signal associated with a central segment of said plurality of segments with respect to said weighting coefficients for the brightness signals associated with segments positioned about said central segment increases as a focal length becomes longer.

36. The compact camera according to claim 35, wherein a weighting coefficient for a brightness signal associated with at least one outermost segment of said plurality of segments approaches zero as the focal length of said photographing optical system becomes longer.

37. The compact camera according to claim 29, wherein said control means comprises means for determining an exposure value based upon weighting coefficients assigned to said brightness signals of each of said segments of said plurality of segments, said control means further comprising means for selecting a weighting coefficient in accordance with a focal length of said photographing optical system and means for calculating a weighted average of products of each of said brightness signals multiplied by a corresponding one of said weighting coefficients to obtain an average brightness level.

38. The compact camera according to claim 29, said control means further comprising backlit detection means for determining whether a backlit condition exists.

39. The compact camera according to claim 38, wherein determination that a backlit condition exists comprises said predetermined condition.

40. The compact camera according to claim 29, further comprising flash mode selection means for selecting between an automatic flash mode and a flash off mode, selection of a flash mode by said flash mode selecting means comprising said predetermined condition.

41. The compact camera according to claim 40, said control means determining an exposure corrective value in accordance with a focal length of said photographing optical system and with differences in selected brightness signals, upon selection of a flash off mode by said flash mode selecting means.

42. The compact camera according to claim 38, wherein said backlit detection means determines the existence of a backlit exposure condition in accordance with predetermined criteria, said predetermined criteria being determined in accordance with a focal length of said photographing optical system.

43. The compact camera according to claim 42, said predetermined criteria comprising a magnitude of difference in brightness level between selected segments.

44. The compact camera according to claim 43, said selected segments comprising segments associated with second highest and second lowest brightness signals.

45. A compact camera comprising:
a photographic optical system having a plurality of focal lengths;
photometric means for providing signals representative of a brightness of a scene to be photographed by said photographic optical system, said photometric means being separate from said photographic optical system and comprising a plurality of photometering segments, each segment outputting a brightness signal; and
control means for combining brightness segments in accordance with a selected relationship of a plurality of relationships to determine an exposure value, said selected relationship being selected by said control means in accordance with a focal length of said photographic optical system.

46. The compact camera according to claim 45, further comprising switching means for switching between a full size photographic aperture and a panoramic size photographic aperture, said control means further comprising means for selecting a predetermined relationship of said plurality of relationships in accordance with selection of an aperture size by said switching means.

47. The compact camera according to claim 45, said predetermined relationship comprising assigning weighting coefficients of different magnitudes to selected brightness signals from said photometric segments.

48. The compact camera according to claim 45, said predetermined relationship comprising means for calculating an exposure correction value.

49. The compact camera according to claim 48, said exposure correction value being determined in accordance with a focal length of said photographic optical system.

50. The compact camera according to claim 45, said predetermined relationship comprising means for assigning predetermined multipliers to selected brightness signals.

51. The compact camera according to claim 47, further comprising means for determining whether a subject is backlit, said predetermined relationship including a backlit threshold.

52. The compact camera according to claim 51, further including means for determining said backlit threshold in accordance with a focal length of said photographic optical system.

* * * * *

UNITED STATES PATENT AND TRADEMARK OFFICE
CERTIFICATE OF CORRECTION

Page 1 of 10

PATENT NO. : 5,440,369
DATED : August 8, 1995
INVENTOR(S) : Y. TABATA et al.

It is certified that error appears in the above-indentified patent and that said Letters Patent is hereby corrected as shown below:

On Title page, item [30], "Foreign Application Priority Data", line 3, change "3-343358" to ---4-343358---.

At column 18, line 16 (claim 1, line 1), after "camera" insert ---,---.

At column 18, line 17 (claim 1, line 2), change "system, the" to ---system having a---.

At column 18, lines 17-18 (claim 1, lines 2-3), delete "of which is".

At column 18, line 21 (claim 1, line 6), after "system" insert ---being---.

At column 18, line 23 (claim 1, line 8), change "to determine" to ---for determining---.

At column 18, line 25 (claim 1, line 10), delete "said".

At column 18, line 28 (claim 1, line 13), before "average" insert ---weighted---.

At column 18, line 28 (claim 1, line 13), change "brightness level" to ---being---.

At column 18, line 29 (claim 1, line 14), change "said" to ---an---.

At column 18, line 30 (claim 2, line 1), after "1" insert ---,---.

At column 18, line 31 (claim 2, line 2), change "a" to ---each---.

At column 18, line 32 (claim 2, line 3), change "in" to ---at---.

At column 18, line 33 (claim 2, line 4), after "said" insert ---plurality of---.

At column 18, line 34 (claim 2, line 5), after "segments" insert ---being---.

At column 18, line 35 (claim 2, line 6), change "segment, and" to ---portion,---.

UNITED STATES PATENT AND TRADEMARK OFFICE
CERTIFICATE OF CORRECTION

PATENT NO. : 5,440,369
DATED : August 8, 1995
INVENTOR(S) : Y. TABATA et al.

It is certified that error appears in the above-indentified patent and that said Letters Patent is hereby corrected as shown below:

At column 18, line 35 (claim 2, line 6), change "segments" to ---plurality of segments being---.
At column 18, line 36 (claim 2, line 7), before "segments," insert ---said plurality of---.
At column 18, line 36 (claim 2, line 7), after "said" (second occurrence) insert ---plurality of---.
At column 18, line 37 (claim 2, line 8), after "groups" insert ---being---.
At column 18, line 40 (claim 3, line 1), change "2 which" to ---2, ---.
At column 18, line 41 (claim 3, line 2), change "comprises a selection" to ---comprising---.
At column 18, line 44 (claim 3, line 5), before "segments" insert ---said plurality of---.
At column 18, line 45 (claim 3, line 6), before "segments" insert ---plurality of---.
At column 18, line 46 (claim 3, line 7), before "segments" insert ---plurality of---.
At column 18, line 50 (claim 4, line 1), after "1" insert ---,---.
At column 18, line 51 (claim 4, line 2), change "range of focal lengths" to ---focal length range---.
At column 18, line 54 (claim 4, line 5), after "coefficients" insert ---being---.
At column 18, line 56 (claim 5, line 1), after "4" insert ---,---.
At column 18, line 57 (claim 5, line 2), change "said" (second occurrence) to ---a---.
At column 18, line 58 (claim 5, line 3), change "segment to" to ---portion of---.
At column 18, line 59 (claim 5, line 4), before "segments" insert ---said plurality of---.

UNITED STATES PATENT AND TRADEMARK OFFICE
CERTIFICATE OF CORRECTION

PATENT NO. : 5,440,369

DATED : August 8, 1995

INVENTOR(S) : Y. TABATA et al.

It is certified that error appears in the above-indentified patent and that said Letters Patent is hereby corrected as shown below:

At column 18, line 59 (claim 5, line 4), after "length" insert ---of said photographing optical system---.
At column 18, line 61 (claim 6, line 1), after "1" insert ---,---.
At column 18, line 62 (claim 6, line 2), after "means" insert ---comprises---.
At column 18, line 63 (claim 6, line 3), change "selects" to ---means for selecting---.
At column 18, line 67 (claim 6, line 7), change "calculates" to ---means for calculating---.
At column 19, line 1 (claim 6, line 9), change "give" to ---obtain---.
At column 19, line 2 (claim 6, line 10), delete "brightness level".
At column 19, line 3 (claim 7, line 1), after "6" insert ---,---.
At column 19, lines 4-5 (claim 7, lines 2-3), delete "brightness selection".
At column 19, line 5 (claim 7, line 3), change "to select" to ---for selecting---.
At column 19, line 9 (claim 8, line 11), change "7 which" to ---7,---.
At column 19, line 10 (claim 8, line 2), change "comprises a" to ---comprising---.
At column 19, lines 10-11 (claim 8, lines 2-3), change "that selects" to ---for selecting---.
At column 19, line 11 (claim 8, line 3), change "flash-off" to ---flash-OFF---.
At column 19, line 12 (claim 8, line 4), before "selection" insert ---flash mode---.
At column 19, line 13 (claim 8, line 5), after "mode" insert ---,---.

UNITED STATES PATENT AND TRADEMARK OFFICE
CERTIFICATE OF CORRECTION

PATENT NO. : 5,440,369
DATED : August 8, 1995
INVENTOR(S) : Y. TABATA et al.

It is certified that error appears in the above-indentified patent and that said Letters Patent is hereby corrected as shown below:

At column 19, line 15 (claim 8, line 7), after "length" insert ---of said photographing optical system---.
At column 19, line 17 (claim 9, line 1), change "7 which" to ---7, ---.
At column 19, line 18 (claim 9, line 2), change "comprises a" to ---comprising---.
At column 19, lines 18-19 (claim 9, lines 2-3), change "that selects" to ---selecting---.
At column 19, line 19 (claim 9, line 3), change "flash-off" to ---flash-OFF---.
At column 19, line 21 (claim 9, line 5), change "flash-off mode" to ---flash-OFF mode,---.
At column 19, line 23 (claim 9, line 7), after "length" insert ---of said photographing optical system---.
At column 19, line 25 (claim 10, line 1), after "9" insert ---,---.
At column 19, line 29 (claim 11, line 1), after "camera" insert ---,---.
At column 19, line 30 (claim 11, line 2), change "which has" to ---having---.
At column 19, line 34 (claim 11, line 6), before "separate" insert ---being---.
At column 19, line 36 (claim 11, line 8), change "to select" to ---for selecting---.
At column 19, line 39 (claim 11, line 11), change "to determine" to ---determining---.
At column 19, line 41 (claim 11, line 13), change "said" (first occurrence) to ---a---.
At column 19, line 41 (claim 11, line 13), after "length" insert ---of said photographic optical system---.

UNITED STATES PATENT AND TRADEMARK OFFICE
CERTIFICATE OF CORRECTION

PATENT NO. : 5,440,369

DATED : August 8, 1995

INVENTOR(S) : Y. TABATA et al.

It is certified that error appears in the above-indentified patent and that said Letters Patent is hereby corrected as shown below:

At column 19, line 44 (claim 12, line 1), after "11" insert ---, ---.

At column 19, line 51 (claim 13, line 1), after "11" insert ---, ---.

At column 19, line 55 (claim 13, line 5), change "varying" to ---being varied---.

At column 19, line 55 (claim 13, line 5), before "optical" insert ---photographing---.

At column 19, line 56 (claim 13, line 6), after "level" insert ---being---.

At column 19, line 58 (claim 14, line 1), after "13" insert ---, ---.

At column 19, line 59 (claim 14, line 2), after "means" insert ---comprises---.

At column 19, line 60 (claim 14, line 3), change "selects" to ---means for selecting---.

At column 19, line 64 (claim 14, line 7), change "calculates" to ---means for calculating---.

At column 19, line 66 (claim 14, line 9), change "give" to ---obtain---.

At column 19, line 67 (claim 14, line 10), delete "brightness level".

At column 19, line 68 (claim 15, line 1), after "camera" insert ---, ---.

At column 20, line 1 (claim 15, line 2), change "system, the" to ---system having a---.

At column 20, lines 1-2 (claim 15, lines 2-3), delete "of which is"

At column 20, line 5 (claim 15, line 6), before "separate" insert ---being---.

UNITED STATES PATENT AND TRADEMARK OFFICE
CERTIFICATE OF CORRECTION

PATENT NO. : 5,440,369

DATED : August 8, 1995

INVENTOR(S) : Y. TABATA et al.

Page 6 of 10

It is certified that error appears in the above-indentified patent and that said Letters Patent is hereby corrected as shown below:

At column 20, line 7 (claim 15, line 8), change "to select" to ---for selecting---.

At column 20, line 10 (claim 15, line 11), change "to determine" to ---for determining---.

At column 20, line 12 (claim 15, line 13), after "length" insert ---of said photographing optical system---.

At column 20, line 15 (claim 16, line 1), after "15" insert ---, ---.

At column 20, line 22 (claim 17, line 1), after "15" insert ---, ---.

At column 20, line 26 (claim 17, line 5), change "varying" to ---being varied---.

At column 20, line 26 (claim 17, line 5), before "optical" insert ---photographing---.

At column 20, line 27 (claim 17, line 6), before "used" insert ---being---.

At column 20, line 29 (claim 18, line 1), after "17" insert ---, ---.

At column 20, line 30 (claim 18, line 2), after "means" insert ---comprises---.

At column 20, line 31 (claim 18, line 3), change "selects" to ---means for selecting---.

At column 20, line 35 (claim 18, line 7), change "calculates" to ---means for calculating---.

At column 20, line 37 (claim 18, line 9), change "give" to ---obtain---.

At column 20, line 38 (claim 18, line 10), delete "brightness level".

At column 20, line 39 (claim 19, line 1), after "18" insert ---, ---.

UNITED STATES PATENT AND TRADEMARK OFFICE
CERTIFICATE OF CORRECTION

PATENT NO. : 5,440,369
DATED : August 8, 1995
INVENTOR(S) : Y. TABATA et al.

It is certified that error appears in the above-indentified patent and that said Letters Patent is hereby corrected as shown below:

At column 20, line 40 (claim 19, line 2), change "calculates" to ---comprises means for calculating---.

At column 20, lines 41-42 (claim 19, lines 3-4), delete "brightness level".

At column 20, line 42 (claim 19, line 4), change "said" to ---an---.

At column 20, line 43 (claim 20, line 1), after "camera" insert ---,---.

At column 20, line 49 (claim 20, line 7), change "output" to ---outputting---.

At column 20, line 52 (claim 20, line 10), change "said" to ---each---.

At column 20, line 52 (claim 20, line 10), change "levels" to ---level---.

At column 20, line 54 (claim 20, line 12), change "the" to ---said---.

At column 20, line 66 (claim 23, line 1), after "camera" insert ---,---.

At column 21, line 4 (claim 23, line 7), change "output" to ---outputting---.

At column 21, line 6 (claim 23, line 9), delete "and".

At column 21, line 9 (claim 23, line 12), before "dependent" insert ---being---.

At column 21, line 10 (claim 23, line 13), after "length" insert ---of said zoom lens system---.

At column 21, line 10 (claim 23, line 13), change "selection" to ---selecting---.

At column 21, line 11 (claim 23, line 14), change "selects" to ---selecting---.

UNITED STATES PATENT AND TRADEMARK OFFICE
CERTIFICATE OF CORRECTION

PATENT NO. : 5,440,369
DATED : August 8, 1995
INVENTOR(S) : Y. TABATA et al.

It is certified that error appears in the above-indentified patent and that said Letters Patent is hereby corrected as shown below:

At column 21, line 14 (claim 23, line 17), change "that" to ---whether---.

At column 21, line 17 (claim 23, line 20), before "equal" insert ---at least---.

At column 21, lines 17-18 (claim 23, lines 20-21), delete "or greater than".

At column 21, line 19 (claim 23, line 22), before "dependent" insert ---being---.

At column 21, line 24 (claim 25, line 1), after "camera" insert ---,---.

At column 21, line 30 (claim 25, line 7), change "output" to ---outputting---.

At column 21, line 32 (claim 25, line 9), delete "and".

At column 21, line 35 (claim 25, line 12), before "dependent" insert ---being---.

At column 21, line 36 (claim 25, line 13), change "selection" to ---selecting---.

At column 21, line 37 (claim 25, line 14), change "selects" to ---selecting---.

At column 21, line 41 (claim 25, line 18), delete "said" (first occurrence).

At column 21, line 44 (claim 25, line 21), after "length" insert ---of said zoom lens system---.

At column 21, line 46 (claim 26, line 2), after "length" insert ---of said zoom lens system---.

At column 21, line 55 (claim 29, line 1), after "camera" insert ---,---.

At column 21, line 61 (claim 29, line 7), before "separate" insert ---being---.

UNITED STATES PATENT AND TRADEMARK OFFICE
CERTIFICATE OF CORRECTION

PATENT NO. : 5,440,369
DATED : August 8, 1995
INVENTOR(S) : Y. TABATA et al.

It is certified that error appears in the above-indentified patent and that said Letters Patent is hereby corrected as shown below:

At column 22, line 13 (claim 31, line 5), after "comprising" insert ---a---.

At column 22, line 25 (claim 33, line 4), after "with" insert ---a---.

At column 22, line 29 (claim 34, line 3), after "system" insert ---,---.

At column 22, line 30 (claim 34, line 4), delete "and".

At column 22, line 38 (claim 35, line 5), change "the" to ---said---.

At column 22, line 44 (claim 36, line 4), change "the" to ---said---.

At column 22, line 64 (claim 39, line 2), after "wherein" insert ---said predetermined condition comprises a---.

At column 22, line 64 (claim 39, line 2), change "a" to ---said---.

At column 22, line 65 (claim 39, line 3), delete "comprises said predetermined condition".

At column 22, line 68 (claim 40, line 3), change "flash off" to ---flash-OFF---.

At column 23, line 1 (claim 40, line 4), before "selection" insert ---a---.

At column 23, line 8 (claim 41, line 5), change "flash off" to ---flash-OFF---.

At column 23, line 11 (claim 42, line 2), change "the" to ---said---.

At column 23, line 12 (claim 42, line 3), change "a backlit exposure" to ---said backlit---.

At column 23, line 22 (claim 45, line 1), after "camera" insert ---,---.

At column 24, line 4 (claim 46, line 2), delete "switching" (first occurrence).

UNITED STATES PATENT AND TRADEMARK OFFICE
CERTIFICATE OF CORRECTION

PATENT NO. : 5,440,369
DATED : August 8, 1995
INVENTOR(S) : Y. Tabata, et. al.

It is certified that error appears in the above-indentified patent and that said Letters Patent is hereby corrected as shown below:

At column 24, line 4 (claim 46, line 2), delete "switching" (first occurrence).

Signed and Sealed this

Fourteenth Day of January, 1997

Attest:

BRUCE LEHMAN

*Attesting Officer*     *Commissioner of Patents and Trademarks*